(12) United States Patent
Cheong

(10) Patent No.: US 11,475,432 B2
(45) Date of Patent: Oct. 18, 2022

(54) METHODS, SYSTEMS, AND DEVICES FOR MANAGING DIGITAL TOKENS, CRYPTOCURRENCIES, AND OTHER DISTRIBUTED LEDGER-RELATED DATA

(71) Applicant: Simon Kai-Tse Cheong, Singapore (SG)

(72) Inventor: Simon Kai-Tse Cheong, Singapore (SG)

(73) Assignee: Simon Kai-Tse Cheong, Singapore (SG)

( * ) Notice: Subject to any disclaimer, the term of this patent is extended or adjusted under 35 U.S.C. 154(b) by 38 days.

(21) Appl. No.: 16/088,063

(22) PCT Filed: Sep. 29, 2017

(86) PCT No.: PCT/CN2017/104246
§ 371 (c)(1),
(2) Date: Sep. 24, 2018

(87) PCT Pub. No.: WO2019/061249
PCT Pub. Date: Apr. 4, 2019

(65) Prior Publication Data
US 2020/0112833 A1 Apr. 9, 2020

Related U.S. Application Data

(60) Provisional application No. 62/564,305, filed on Sep. 28, 2017, provisional application No. 62/564,256, filed on Sep. 27, 2017.

(51) Int. Cl.
*G06Q 20/32* (2012.01)
*G06Q 20/36* (2012.01)
(Continued)

(52) U.S. Cl.
CPC ....... *G06Q 20/3224* (2013.01); *G06Q 20/367* (2013.01); *G06Q 20/389* (2013.01);
(Continued)

(58) Field of Classification Search
None
See application file for complete search history.

(56) References Cited

U.S. PATENT DOCUMENTS 7,934,639 B1 * 5/2011 Chen ...................... G06Q 30/02
235/375
9,213,675 B1 * 12/2015 Kolton ............... G06Q 20/3224
(Continued)

FOREIGN PATENT DOCUMENTS

CN 105487816 A 4/2016
CN 106357357 A 1/2017
(Continued)

OTHER PUBLICATIONS

Li et al. CrowdBC: A Blockchain-based Decentralized Framework for Crowdsourcing, retrieved on Jul. 10, 2017 from https://web.archive.org/web/20170710015320/http://eprint.iacr.org/2017/444.pdf (Year: 2017).*
(Continued)

*Primary Examiner* — Jacob C. Coppola
*Assistant Examiner* — Eduardo Castilho
(74) *Attorney, Agent, or Firm* — Baker & McKenzie LLP

(57) ABSTRACT

Example embodiments relate to systems, devices, logic, methods, and processes for managing distributed ledgers. In an exemplary embodiment, the method may include identifying, by a processor, one or more desired user attributes. The method may also include searching, by the processor, a database. The database may include a plurality of users and a plurality of stored attributes for each user. The method may also include selecting, by the processor from the database,
(Continued)

one or more candidate users. Each candidate user may be a user having one or more stored attributes that match the one or more desired user attributes. The method may also include processing, by the processor, a distribution of one or more distributed ledger data to one or more of the candidate users.

8 Claims, 5 Drawing Sheets

(51) Int. Cl.
| | | |
|---|---|---|
| G06Q 20/38 | (2012.01) | |
| G06Q 30/02 | (2012.01) | |
| H04W 4/029 | (2018.01) | |
| H04W 4/021 | (2018.01) | |
| H04W 4/02 | (2018.01) | |
| H04L 9/00 | (2022.01) | |
| H04L 67/52 | (2022.01) | |
| H04W 12/06 | (2021.01) | |

(52) U.S. Cl.
CPC ............ *G06Q 30/0207* (2013.01); *H04L 9/50* (2022.05); *H04L 67/52* (2022.05); *H04W 4/021* (2013.01); *H04W 4/023* (2013.01); *H04W 4/029* (2018.02); *H04W 12/06* (2013.01)

(56) References Cited

U.S. PATENT DOCUMENTS

| | | | | |
|---|---|---|---|---|
| 9,648,581 | B1* | 5/2017 | Vaynblat | G06Q 50/01 |
| 9,832,159 | B1* | 11/2017 | Kursun | H04L 51/16 |
| 10,354,252 | B1* | 7/2019 | Sahar | G06Q 20/3224 |
| 11,025,409 | B1* | 6/2021 | Fields | G06Q 20/3825 |
| 11,159,909 | B2* | 10/2021 | Anderson | G01C 15/04 |
| 2006/0218651 | A1* | 9/2006 | Ginter | H04N 21/2543 |
| | | | | 726/27 |
| 2009/0138328 | A1* | 5/2009 | Higgins | G06Q 30/0207 |
| | | | | 705/14.1 |
| 2012/0265578 | A1* | 10/2012 | Olding | G06Q 10/06 |
| | | | | 705/7.25 |
| 2014/0089049 | A1* | 3/2014 | Cristofaro | G06Q 30/0203 |
| | | | | 705/7.32 |
| 2014/0297743 | A1* | 10/2014 | Zyto | H04L 67/10 |
| | | | | 709/204 |
| 2014/0343984 | A1* | 11/2014 | Shahabi | G06Q 10/06311 |
| | | | | 705/7.13 |
| 2015/0269624 | A1* | 9/2015 | Cheng | G06Q 30/0261 |
| | | | | 705/14.58 |
| 2017/0055120 | A1* | 2/2017 | Shaffer | A41D 19/015 |
| 2017/0098256 | A1* | 4/2017 | Long | G06Q 30/0277 |
| 2017/0236094 | A1* | 8/2017 | Shah | G06Q 10/101 |
| | | | | 705/300 |
| 2017/0243239 | A1* | 8/2017 | El-Eid | G06Q 30/0208 |
| 2018/0043253 | A1* | 2/2018 | Auterio | A63F 13/00 |
| 2018/0053161 | A1* | 2/2018 | Bordash | G06Q 20/382 |
| 2018/0129952 | A1* | 5/2018 | Saxena | G06Q 20/02 |
| 2018/0150865 | A1* | 5/2018 | Arora | G06Q 20/389 |
| 2020/0078666 | A1* | 3/2020 | Monsarrat | G06Q 30/0209 |

FOREIGN PATENT DOCUMENTS

| | | |
|---|---|---|
| CN | 106803179 A | 6/2017 |
| CN | 106981004 A | 7/2017 |

OTHER PUBLICATIONS

Abhilash Manapatt, Method of Providing Mobile Coupons for Location Based Targeted Advertising, 2011 https://priorart.ip.com/IPCOM/000202801 (Year: 2011).*

A. Greenwald, G. Hampel, C. Phadke and V. Poosala, "An economically viable solution to geofencing for mass-market applications," in Bell Labs Technical Journal, vol. 16, No. 2, pp. 21-38, Sep. 2011, doi: 10.1002/bltj.20500. (Year: 2011).*

S. R. Garzon and B. Deva, "On the Evaluation of Proactive Location-Based Services," 2015 IEEE 39th Annual Computer Software and Applications Conference, 2015, pp. 585-594, doi: 10.1109/COMPSAC.2015.122. (Year: 2015).*

J. Jiang et al., "Towards Secure and Accurate Targeted Mobile Coupon Delivery," in IEEE Access, vol. 4, pp. 8116-8126, 2016, doi: 10.1109/ACCESS.2016.2624779. (Year: 2017).*

Simone Frattasi; Francescantonio Della Rosa, "Application Areas of Positioning," in Mobile Positioning and Tracking: From Conventional to Cooperative Techniques , IEEE, 2016, pp. 11-42, doi: 10.1002/9781119068846.ch2. (Year: 2017).*

International Search Report and Written Opinion of PCT/CN2017/104246 issued by International Searching Authority (Chinese State Intellectual Property Office), dated Jun. 27, 2018.

First Office Action dated Jul. 5, 2021 in connection with Chinese Application No. 201780021840.8, 5 pages.

* cited by examiner

METHODS, SYSTEMS, AND DEVICES FOR MANAGING DIGITAL TOKENS, CRYPTOCURRENCIES, AND OTHER DISTRIBUTED LEDGER-RELATED DATA

CROSS-REFERENCE TO RELATED APPLICATIONS

This application is a U.S. National Stage Entry of International Application No. PCT/CN2017/104246 filed on Sep. 29, 2017, which claims benefit of U.S. Provisional Patent Application No. 62/564,256 filed on Sep. 27, 2017 and also claims benefit of U.S. Provisional Patent Application No. 62/564,305 filed on Sep. 28, 2017, the entire contents of all of which are incorporated herein by reference in their entirety.

TECHNICAL FIELD

The present disclosure relates generally to managing distributed ledgers, and more specifically, to methods, systems, devices, and logic for managing digital tokens, cryptocurencies, and/or other distributed ledger-related data.

BACKGROUND

Businesses around the world continue to launch new and improved incentive and reward programs, enticing customers and businesses alike to join and spend to collect points and/or mileage. It is estimated that the global rewards and incentives industry, as of 2017, may be valued as much as USD 300 billion, and growing at a rate of 6% per annum. It is also estimated that an average user or consumer (hereinafter "user", which may include individual users and/or business/corporate users as well) has joined upwards of 30 or more incentive and/or reward programs.

Recent developments in computing technology have further improved user experience and interest in incentive and reward programs by allowing users to access their incentive and reward accounts using their computing devices to see transactions and balances, and even redeem their accumulated points, air miles, etc. (hereinafter "points") for products and/or services directly from their computing devices.

BRIEF SUMMARY

Despite recent advances and interest in incentive and reward programs, including the underlying technologies that implement and support such programs and ever-increasing numbers and variations of new and improved programs aimed to draw more users to join and spend to accumulate points, it is recognized in the present disclosure that problems and/or difficulties are oftentimes encountered. For example, a significant majority of points awarded to users by incentive and reward programs today are simply not utilized.

Present example embodiments relate generally to and/or comprise systems, subsystems, processors, devices, logic, methods, and processes for addressing conventional problems, including those described above and in the present disclosure, and more specifically, example embodiments relate to systems, subsystems, processors, devices, logic, methods, and processes for managing distributed ledger-related data including, but not limited to, managing the processing of selective and/or targeted recording of transfers, distributions, offerings, allocations, issuances, rewarding, and/or awarding (hereinafter "transfer," "transferring," "transferred," "transfers," "distribute," "distributing," distributed," and/or "distribution", each as applicable) of digital tokens, cryptocurrencies, blockchain-related, and/or other distributed ledger-related data.

In an exemplary embodiment, a method of managing distributed ledger data is described. The method may include establishing a communication channel between a processor and a computing device of a provider. The method may also include receiving, at the processor from the provider computing device, a communication request. The communication request may be a request to process a recording of a transfer of digital tokens from the provider to one or more users based on one or more user criterion and one or more location criterion. The method may also include performing, by the processor, a first selection process. The first selection process may include extracting, from the communication request, the one or more user criterion. The first selection process may also include transforming the one or more user criterion into one or more desired user attributes. The first selection process may also include searching a database, the database having a plurality of registered users and a plurality of stored attributes for each registered user. The first selection process may also include selecting, from the database, one or more candidate users. Each candidate user may be a registered user having one or more stored attributes that match the one or more desired user attributes. The method may also include performing, by the processor, a second selection process. The second selection process may include extracting, from the communication request, the one or more location criterion. The second selection process may also include transforming the one or more location criterion into one or more desired user locations. The second selection process may also include communicating, between the processor and a computing device of each candidate user. The communicating may include obtaining, by the processor, a current geolocation of the computing device of each candidate user. The second selection process may also include selecting, from among the one or more candidate users, one or more selected users. A candidate user is selected as one of the selected users when the current geolocation of the computing device of that candidate user is within at least a threshold distance from at least one of the desired user locations. The method may also include pushing, from the processor to a computing device of a first selected user, a notification. The notification may include an interactive option to accept a recording of a transfer of a first quantity of digital tokens from the provider to the first selected user. The first selected user may be one of the selected users. Responsive to receiving, by the processor from the computing device of the first selected user, a response indicative of accepting the recording of the transfer of the first quantity of digital tokens from the provider to the first selected user, the method may also include processing, by the processor, a transfer record for the recording of the transfer of the first quantity of digital tokens from the provider to the first selected user. Responsive to receiving, by the processor from the computing device of the first selected user, a response indicative of accepting the recording of the transfer of the first quantity of digital tokens from the provider to the first selected user, the method may also include recording, by the processor in a distributed ledger, the transfer record.

In another exemplary embodiment, a method of managing distributed ledger data is described. The method may include receiving, by a processor, a request to process a selective distribution of distributed ledger data. The method may also include extracting, by the processor, one or more desired user attributes from the request. The method may also include searching, by the processor, a database. The database may include a plurality of users and a plurality of stored attributes for each user. The method may also include selecting, by the processor, one or more candidate users. Each candidate user may be a user having one or more stored attributes matching the one or more desired user attributes. The method may also include communicating, between the processor and a computing device of each candidate user. The communicating may include obtaining, by the processor, geolocation information of the computing device of each candidate user. The method may also include determining, by the processor, one or more target locations. Responsive to the processor obtaining, from a computing device of a first candidate user, geolocation information of the computing device of the first candidate user indicative of the first candidate user being and/or having been present at one of the target locations, the method may include processing, by the processor, a distribution of a quantity of distributed ledger data to the first candidate user. The first candidate user is one of the candidate users.

In another exemplary embodiment, a method of managing distributed ledger data is described. The method may include receiving, at a processor, a request to distribute distributed ledger data. The method may also include extracting, by the processor, one or more desired user attributes from the request. The method may also include searching, by the processor, a database. The database may include a plurality of users and a plurality of stored attributes for each user. The method may also include selecting, by the processor, a first candidate user and second candidate user. Each of the first and second candidate users may have one or more stored attributes that match the one or more desired user attributes. The method may also include determining, by the processor, a first set of target locations. The first set of target locations are target locations selected for the first candidate user. The method may also include determining, by the processor, a second set of target locations. The second set of target locations are target locations selected for the second candidate user. The second set of target locations may be different from the first set of target locations. Responsive to the processor obtaining, from a computing device of the first candidate user, geolocation information of the computing device of the first candidate user matching a target location in the first set of target locations, the method may include processing, by the processor, a distribution of a first quantity of distributed ledger data to the first candidate user. Responsive to the processor obtaining, from a computing device of the second candidate user, geolocation information of the computing device of the second candidate user matching a target location in the second set of target locations, the method may include processing, by the processor, a distribution of a second quantity of distributed ledger data to the second candidate user.

In another exemplary embodiment, a method of managing distributed ledger data is described. The method may include receiving, at a processor, a request to distribute distributed ledger data. The method may also include extracting, by the processor, one or more target locations and one or more desired user attributes from the request. The method may also include communicating, between the processor and computing devices of a plurality of users. The communicating may include obtaining, by the processor, geolocation information of the computing device of each user. The method may also include processing, by the processor, the obtained geolocation information, including a geolocation of a computing device of a first candidate user. Responsive to the processor determining that the geolocation of the computing device of the first candidate user is within a threshold distance of one of the target locations, the method may also include searching a database for stored attributes of the first candidate user, comparing the stored attributes of the first candidate user to the one or more desired user attributes; and providing a quantity of the distributed ledger data to the first candidate user when one or more stored attributes of the first candidate user matches one or more of the desired user attributes.

In another exemplary embodiment, a method of managing distributed ledger data is described. The method may include identifying, by a processor, one or more desired user attributes. The method may also include searching, by the processor, a database. The database may include a plurality of users and a plurality of stored attributes for each user. The method may also include selecting, by the processor from the database, one or more candidate users. Each candidate user may be a user having one or more stored attributes that match the one or more desired user attributes. The method may also include processing, by the processor, a distribution of one or more distributed ledger data to one or more of the candidate users.

In another exemplary embodiment, a method of managing distributed ledger data is described. The method may include identifying, by a processor, one or more desired user attributes. The method may also include obtaining, by the processor, contextual information associated with one or more historic interactions between a first user and a computing device of the first user. The method may also include processing, by the processor, a distribution of one or more distributed ledger data to the first user when the contextual information matches the desired user attributes.

In another exemplary embodiment, a method of managing distributed ledger data is described. The method may include receiving, at a processor, a request to distribute distributed ledger data. The method may also include extracting, from the request, one or more target locations. The method may also include communicating, between the processor and computing devices of a plurality of users. The communicating may include obtaining, by the processor, geolocation information of the computing device of each user. The method may also include processing, by the processor, the obtained geolocation information, including a geolocation of a computing device of a first candidate user. Responsive to the processor determining that the geolocation of the computing device of the first candidate user is within a threshold distance of one of the target locations, the method may also include processing, by the processor, a distribution of one or more distributed ledger data to the first candidate user.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements in the figures for convenience, it can be appreciated that each of the various example embodiments may be considered to be distinct variations.

Figure 1:
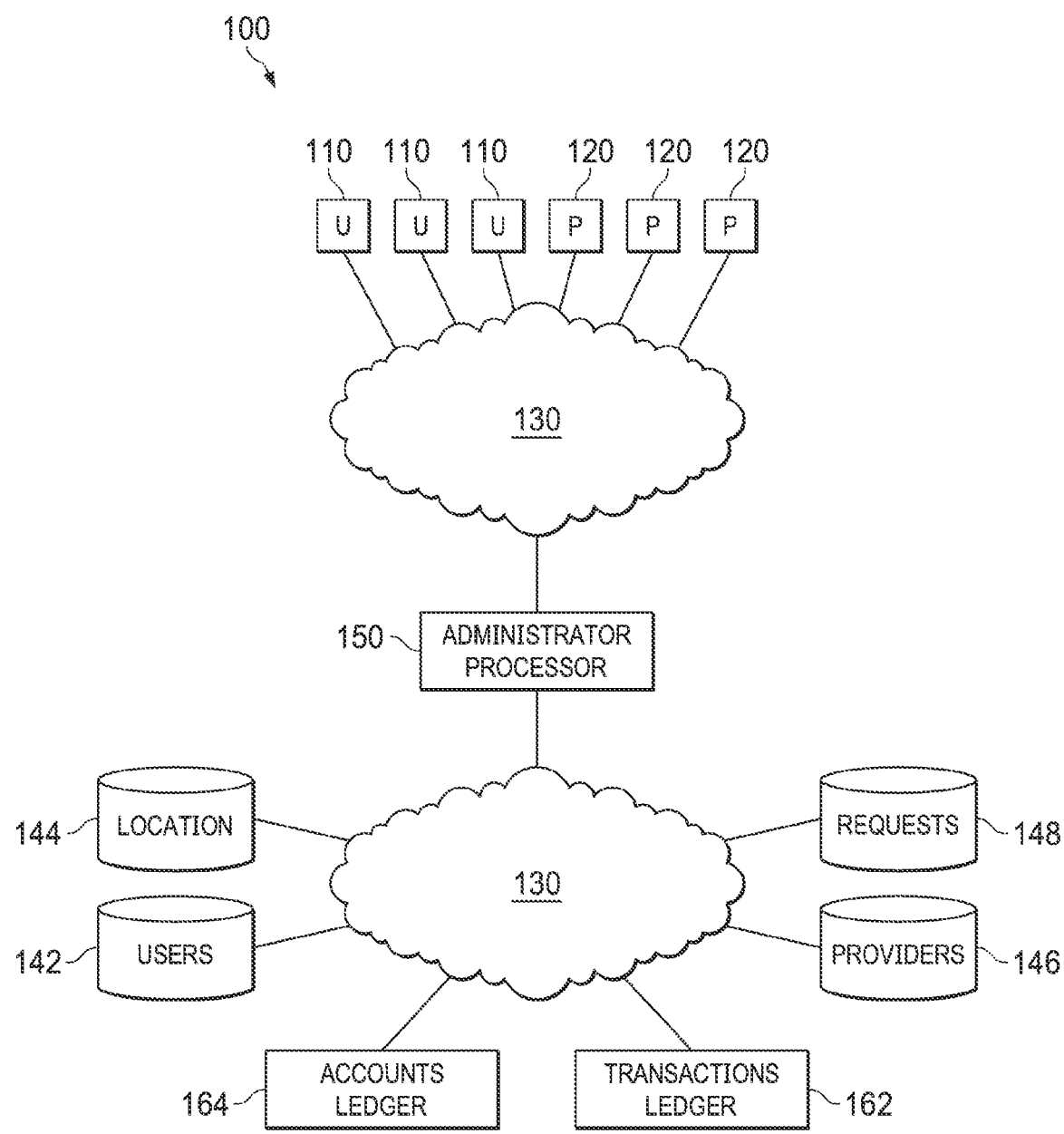
FIG. 1 is an illustration of an example embodiment of a system for managing distributed ledger data.

Example embodiments will now be described with reference to the accompanying drawings, which form a part of the present disclosure and which illustrate example embodiments which may be practiced. As used in the present disclosure and the appended claims, the terms "embodiment," "example embodiment," "exemplary embodiment," and "present embodiment" do not necessarily refer to a single embodiment, although they may, and various example embodiments may be readily combined and/or interchanged without departing from the scope or spirit of example embodiments. Furthermore, the terminology as used in the present disclosure and the appended claims is for the purpose of describing example embodiments only and is not intended to be limitations. In this respect, as used in the present disclosure and the appended claims, the term "in" may include "in" and "on," and the terms "a," "an," and "the" may include singular and plural references. Furthermore, as used in the present disclosure and the appended claims, the term "by" may also mean "from," depending on the context. Furthermore, as used in the present disclosure and the appended claims, the term "if" may also mean "when" or "upon," depending on the context. Furthermore, as used in the present disclosure and the appended claims, the words "and/or" may refer to and encompass any and all possible combinations of one or more of the associated listed items.

DETAILED DESCRIPTION

Technological developments in the incentive and reward industry continue to empower businesses to launch new and improved incentive and reward programs. Many such developments have further improved user experience and interest in incentive and reward programs. For example, most programs today allow users to access their incentive and reward accounts anywhere in the world using their computing devices. Once logged into their accounts, users are then able to see their historic transactions and balances, and even redeem their accumulated points for products and/or services directly from their computing devices.

Despite recent technological advances in incentive and reward programs, it is recognized in the present disclosure that problems and/or difficulties are oftentimes encountered. For example, a significant majority of points awarded to users by incentive and reward programs today are simply not utilized. Based on survey results, it is estimated that over 75% of users have no plans to use their awarded points. Example reasons for such under-utilization or lack of use may include, but are not limited to, the difficulty in tracking the numerous incentive and reward programs joined, the requirement by most incentive and reward programs to present a physical card to collect and/or redeem points, the relatively small quantities of points accumulated in each of their incentive and reward program accounts which prevent users from redeeming such points or redeeming anything meaningful, and/or the inability or severe restrictions/limitations in transferring points collected from one provider to another provider or combining points collected from one provider with points collected from another provider. As used in the present disclosure, a "provider" may include a business, company, individual, provider, service provider, organization, institution, government entity, non-profitable entity, educational institution, etc. For example, a provider may include a particular airline company (e.g., Cathay Pacific Airlines, Singapore Airlines, Air Asia, etc.), hotel operator (e.g., Marriott, Holiday Inn, Sheraton, etc.), restaurant (e.g., Hard Rock Café, McDonalds, Mortons, etc.), credit card company (e.g., American Express, Visa, MasterCard, etc.), bank (e.g., Citi, Standard Chartered, HSBC, etc.), ground transportation company (e.g., taxis, e-Hailing companies, trains, shuttles, etc.), department store (e.g., Saks, Sears, etc.), retailer (e.g., Walmart, Banana Republic, Best Buy, Home Depot, etc.), convenient store (e.g., 7 Eleven, Circle K, etc.), disruptive technologies (e.g., Airbnb, Uber, Lyft, etc.), online retailers (e.g., Amazon, Alibaba, etc.), technology companies (e.g., Apple, Google, Microsoft, Samsung, etc.), individuals such as proprietors or entrepreneurs (e.g., owner/operator of a local restaurant; owner/operator of a local coffee shop; privately owned airline; personally-owned taxi, including those used in providing services via Uber, Lyft, and other e-Hailing services; privately owned hotel, motel, bed-and-breakfast, or property rented out on Airbnb; owner/operator of a vending machine; a seller on eBay, Alibaba, or other online shopping platforms; celebrities, sports stars, politicians, and other well-known or public figures); etc.

Present example embodiments relate generally to and/or comprise systems, subsystems, processors, devices, logic, methods, and processes for addressing conventional problems, including those described above and in the present disclosure, and more specifically, example embodiments relate to systems, subsystems, processors, devices, logic, methods, and processes for managing distributed ledger data. As used in the present disclosure, "distributed ledger data" may include any and all data stored or storable on a distributed ledger (e.g., blockchains such as the Ethereum blockchain, the blockchain for Bitcoin, etc.), such as digital tokens, cryptocurrencies (e.g., bitcoin, ether, Litecoin, etc.), and/or other distributed ledger data. Although example embodiments may be described in the present disclosure as pertaining to and/or for use with the incentive and/or reward industry, it is to be understood that example embodiments may also be applicable to and/or for use with other industries, for other purposes, products, and services, and in other environments, surroundings, situations, circumstances, and/or applications without departing from the teachings of the present disclosure. These example embodiments will now be described below with reference to the accompanying figures, which form a part of the present disclosure.

Example Embodiments of a System for Managing Distributed Ledger Data (e.g., System 100).

As an overview, an example embodiment of a system (e.g., system 100) for managing distributed ledger data is illustrated in FIG. 1. The system 100 may be configurable or configured to perform one or more of a plurality of functions, operations, actions, methods, and/or processes. As a non-limiting example, the system 100 may be configurable or configured to manage, control, and/or interact with a distributed ledger (e.g., the Ethereum blockchain, etc.). As another non-limiting example, the system 100 may be configurable or configured to process distributions and/or transfers of distributed ledger data (e.g., digital tokens, cryptocurrencies, etc.) from one entity (e.g., a provider and/or user) to another entity (e.g., a provider and/or user). It is recognized in the present disclosure that, as known by persons of ordinary skill in the art, certain distributed ledger data may not exist in actual physical form or on any one particular database, processor, or device. Accordingly, as used in the present disclosure, references to a transfer and/or distribution of distributed ledger data (e.g., digital tokens, cryptocurrencies, etc.) may pertain to a record or recording (hereinafter "record," "recording," "transfer record," "transaction record," or the like) of a transaction between addresses (e.g., public keys, etc.) in a distributed ledger, and may not pertain to an actual transfer of distributed ledger data from one entity to another entity.

As illustrated in FIG. 1, the system 100 may include one or more administrator processors (e.g., administrator processor 150). As used in the present disclosure, when applicable, a reference to a processor or administrator processor may also refer to, apply to, and/or include a computing device, processor, server, cloud-based computing, or the like, and/or functionality of a processor, computing device, server, cloud-based computing, or the like. The system 100 may also include one or more databases. For example, the system 100 may include one or more user databases (e.g., user database 142) for storing information pertaining to one or more users, including one or more attributes for each user, one or more location databases (e.g., location database 144) for storing current (e.g., real-time or near real-time) and/or historic location information, such as geolocation information, of one or more users and/or one or more computing devices of one or more users; one or more provider databases (e.g., provider database 146) for storing information pertaining to one or more providers; and/or one or more request databases (e.g., request database 148) for storing information pertaining to requests received from providers and/or users. The system 100 may also include one or more distributed ledgers, such as one or more accounts ledgers (e.g., accounts ledger 164) and/or one or more transactions ledgers (e.g., transaction ledger 166). As used in the present disclosure, when and where applicable, a reference to a database, blockchain, and/or distributed ledger may also refer to, apply to, and/or include database systems, database management systems, cloud-based computing, cloud-based storage, storage systems and devices, distributed ledger-related technologies and system, blockchain-related technologies and systems, or the like. The system 100 may also include one or more user computing devices (e.g., user computing device 110). Each computing device 110 may be configurable or configured to perform, among other things, a determination of geolocations of the computing device 110 and/or user of the computing device 110; sending of current and/or historic geolocations of the computing device 110 and/or user of the computing device 110; identifying, monitoring, and/or providing of contextual information (e.g., information pertaining to communications and/or interactions between a user, a computing device of the user, other computing devices, other users, social media, etc.); and/or one or more of the actions, processes, and/or functionalities described in the present disclosure. The system 100 may also include one or more provider computing devices (e.g., provider computing device 120). Each provider computing device 120 may be configurable or configured to perform, among other things, generating of new distributed ledger data (e.g., digital tokens, etc.), issuing of new distributed ledger data, transferring or distributing of distributed ledger data, receiving of distributed ledger data, generating of requests for actions, methods, and/or processes to be performed by the administrator processor 150, establishing communication channels with the administrator processor 150 and/or other computing devices, transmitting of generated requests to the administrator processor 150 (e.g., via communication channels established between the provider computing device and administrator processor), and/or one or more of the actions, processes, and/or functionalities described in the present disclosure. The one or more administrator processors 150, databases 142, 144, 146, and/or 148, distributed ledgers 162, 164, user computing devices 110, and/or provider computing devices 120 may be in communication with one another via one or more networks (e.g., network, 130), such as the Internet, World Wide Web, one or more private networks, the cloud, or the like. In some example embodiments, such communication may also be a direct and/or indirect communication between elements (e.g., direct and/or line-of-sight range, within Wi-Fi range, within Bluetooth range, within audio signal range (e.g., Google Nearby), and/or via tapping of a computing device with another computing device, reader, etc.).

Example embodiments of the system 100 may include or not include one or more of the elements described above and in the present disclosure, may include additional elements, may include equivalent elements, may be formed, implementable/implemented, and/or used in different sequences, actions, combinations, and/or configurations, and/or one or more of the elements (and/or elements of elements) may be combinable into a single element or divided into two or more elements. It is also to be understood in the present disclosure that one or more functionalities, actions, methods, and/or processes performed or performable by one or more of the elements described above and in the present disclosure may be implemented or implementable, directly or indirectly, using or via one or more other elements or ways, such as via cloud computing, parallel, collaborative, and/or distributed computing or processing, distributed ledger technology (DLT) such as via Ethereum, or the like. Communication using technologies other than the Internet are also contemplated in example embodiments without departing from the teachings of the present disclosure. These systems 100, and elements and functionality thereof, will now be further described with reference to the accompanying figures and the actions and methods (e.g., method 500 illustrated in FIG. 5) described in the present disclosure.

User Computing Device (e.g., User Computing Device 110).

As illustrated in at least FIG. 1, the system 100 may include one or more computing devices 110 for use by users. A user computing device 110 may be any device, computing device, mobile computing device, processor, controller, or the like, configurable or configured to perform a processing of information, communicate via wired and/or wireless communications, and/or any of the other actions, processes, and/or functionalities described above and in the present disclosure. For example, the user computing device 110 may be configurable or configured to perform wireless communications through 3G networks, 4G networks, 4G LTE networks, or the like, such as via a SIM card installed in the user computing device 110, or the like. In addition to or alternatively, the user computing device 110 may be configurable or configured to perform wireless communications via WLANs, such as Wi-Fi networks and Li-Fi networks, and/or via other forms, such as Bluetooth, NFC, sound (e.g., Google Nearby), and other forms of wireless signals. One or more of the aforementioned communications may be between example embodiments of the user computing device 110, one or more processors 150, one or more provider computing devices 120, one or more databases 142, 144, 146, and/or 148, one or more distributed ledgers 162 and/or 164, and/or one or more networks 130.

In an example embodiment, the user computing device 110 may be configurable or configured (e.g., via software, such as a mobile application, installed on the user computing device) to perform, among other things, a determination of geolocation(s) of the computing device 110 and/or user of the computing device 110; sending of current and/or historic geolocations of the computing device 110 and/or user of the computing device 110; identifying, monitoring, and/or providing of contextual information; and/or one or more of the actions, processes, and/or functionalities described in the present disclosure. The user computing device 110 may be configurable or configured (e.g., via software, such as a mobile application, installed on the user computing device) to communicate, wirelessly or via wires, with the processor 150 and such communications may include sending of current and/or historic geolocations of the computing device 110 and/or user of the computing device 110; providing stored user attributes; providing contextual information; receiving push notifications (e.g., offers for distributed ledger data such as digital tokens and cryptocurrencies from one or more providers; alerts regarding chances, opportunities, and hints to obtain, find, and/or win distributed ledger data such as digital tokens and cryptocurrencies; etc.); receiving updates on transactions and/or balances for distributed ledger data such as digital tokens and cryptocurrencies; and/or one or more of the actions, processes, and/or functionalities described in the present disclosure. As used in the present disclosure, contextual information of a user may include, but is not limited to, information pertaining to communications and/or interactions between a user and one or more computing device of the user, communications and/or interactions between a user (and/or user computing device) and other computing devices; communications and/or interactions between a user (and/or user computing device) and the administrator processor 150; communications and/or interactions between a user (and/or user computing device) and one or more provider computing devices 120; communications and/or interactions between a user (and/or user computing device) and one or more databases 142 144, 146, and/or 148; communications and/or interactions between a user (and/or user computing device) and one or more distributed ledgers 162 and/or 164; communications and/or interactions between a user (and/or user computing device) and other users and/or other user computing devices 110; communications and/or interactions between a user (and/or user computing device) and a social media platform or service; etc. Furthermore, as used in the present disclosure, "user attributes" may include, but is not limited to, information pertaining to a user such as a name (e.g., first name, last name, middle name, alias, and/or login name), email address, address (e.g., residential address, work address, etc.), citizenship, residency, passport, drivers license, national ID card, credit cards, debit cards, bank information, electronic wallet, phone (e.g., mobile phone, home phone, work phone, facsimile, Skype, Facetime, WhatsApp, etc.), Ethereum address, Bitcoin address, employment (e.g., company/organization, etc.), job title, profession, industry, salary range, cryptocurrency trading risk tolerance, sex, marital status, social network, family members, education, educational institution, date of birth, religion, political interests, other interests (e.g., sports, technology, arts, music, movies, television shows, etc.), spending preferences (e.g., food, beverage, technology, fashion, travel, transportation, etc.), method of payment preferences (e.g., cash, credit card, debit card, cryptocurrencies, etc.), etc.

In an example embodiment, the user computing device 110 may be directed to and/or include mobile computing devices, smart phones, mobile phones, PDAs, phablets, tablets, portable computers, laptops, notebooks, ultrabooks, readers, electrical devices, media players, specialized devices (e.g., a dedicated or specialized device to communicate with and/or operate in the system 100, or parts thereof), smart speakers, digital assistants, smart appliances, computing devices installed in vehicles, a plurality of computing devices interacting together in part or in whole, and other specialized computing devices and industry-specific computing devices. The user computing device 110 described herein may also be directed to and/or include wearable computing devices, including watches (such as the Apple Watch), glasses, etc. The user computing device 110 may also be directed to and/or include a virtual machine, computer, node, instance, host, or machine in a networked computing environment. Such networked environment, and/or cloud, may be a collection of machines connected by communication channels that facilitate communications between machines and allow for machines to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

Provider Computing Device (e.g., Provider Computing Device 120).

As illustrated in at least FIG. 1, the system 100 may include one or more computing devices 120 for use by providers. Provider computing devices 120 may be any device, computing device, mobile computing device, processor, controller, or the like, configurable or configured to perform a processing of information, communicate via wired and/or wireless communications, and/or any of the other actions and/or processes described above and in the present disclosure. For example, the provider computing device 120 may be configurable or configured to perform wireless communications through 3G networks, 4G networks, 4G LTE networks, or the like, such as via a SIM card installed in the provider computing device 120, or the like. In addition to or alternatively, the provider computing device 120 may be configurable or configured to perform wireless communications via WLANs, such as Wi-Fi networks and Li-Fi networks, and/or via other forms, such as Bluetooth, NFC, sound signals, and other forms of wireless signals. One or more of the aforementioned communications may be between example embodiments of the provider computing device 120, one or more processors 150, one or more user computing devices 110, one or more databases 142, 144, 146, and/or 148, one or more distributed ledgers 162 and/or 164, and/or one or more networks 130.

In an example embodiment, the provider computing device 120 may be configurable or configured (e.g., via software, such as a mobile application, installed on the provider computing device) to, among other things, generate, instruct the administrator processor 150 to generate, and/or record (e.g., via the administrator processor 150) in a distributed ledger a generating of new distributed ledger data (e.g., digital tokens or cryptocurrency) (all of which have similar or the same meaning in the present disclosure); issue, instruct the administrator processor 150 to issue, and/or record (e.g., via the administrator processor 150) in a distributed ledger an issuance of new distributed ledger data (e.g., digital tokens or cryptocurrency) (all of which have similar or the same meaning in the present disclosure); transfer/distribute, instruct the administrator processor 150 and/or a distributed ledger to transfer/distribute, and/or record (e.g., via the administrator processor 150) in a distributed ledger a transfer/distribution of distributed ledger data (e.g., digital tokens or cryptocurrency) (all of which have similar or the same meaning in the present disclosure); receive, instruct the administrator processor 150 to receive, and/or record (e.g., via the administrator processor 150) in a distributed ledger a receiving of distributed ledger data (e.g., digital tokens or cryptocurrency) (all of which have similar or the same meaning in the present disclosure); destroy/suspend/deactivate/delete, instruct the administrator processor 150 to destroy/suspend/deactivate/delete, and/or record (e.g., via the administrator processor 150) in a distributed ledger a destroying/suspending/deactivating/deleting of distributed ledger data (e.g., digital tokens or cryptocurrency) (all of which have similar or the same meaning in the present disclosure); consolidate or split, instruct the administrator to consolidate or split, and/or record (e.g., via the administrator processor 150) a consolidation or splitting of distributed ledger data (e.g., digital tokens or cryptocurrency); identify or instruct the administrator processor 150 to identify one or more quantities and/or addresses of distributed ledger data (e.g., digital tokens or cryptocurrency) to be transferred; identify or instruct the administrator processor 150 to identify one or more target locations where one or more users need to visit (e.g., be physically present with the user computing device 110 and send or confirm a geolocation of the user computing device 110) in order to receive, have the administrator processor 150 receive on behalf of the user, and/or record (e.g., via the administrator processor 150) in a distributed ledger a receiving of distributed ledger data (e.g., digital tokens or cryptocurrency); identify or instruct the administrator processor 150 to identify one or more other actions that one or more users must perform (or not perform) in order to receive, have the administrator processor 150 receive on behalf of the user, and/or record (e.g., via the administrator processor 150) in a distributed ledger a receiving of distributed ledger data (e.g., digital tokens or cryptocurrency); generate or instruct the administrator processor 150 to generate requests for actions, methods, and/or processes to be performed by the administrator processor 150 and/or one or more distributed ledgers; establish communication channels with the administrator processor 150, other computing devices 110 and/or 120, databases 142, 144, 146, and/or 148, and/or distributed ledgers 162 and/or 164; transmit or instruct the administrator processor 150 to transmit generated requests to the administrator processor 150 and/or one or more distributed ledgers (e.g., via established communication channels); and/or one or more of the actions, processes, and/or functionalities described in the present disclosure.

In an example embodiment, the provider computing device 120 described herein may be directed to and/or include mobile computing devices, smart phones, mobile phones, PDAs, phablets, tablets, portable computers, laptops, notebooks, ultrabooks, readers, electrical devices, media players, specialized devices (e.g., a dedicated or specialized device to communicate with and/or operate in the system 100, or parts thereof), smart speakers, digital assistants, smart appliances, a plurality of computing devices interacting together in part or in whole, and other specialized computing devices and industry-specific computing devices. The provider computing device 120 described herein may also be directed to and/or include wearable computing devices, including watches (such as the Apple Watch), glasses, etc. The provider computing device 120 may also be directed to and/or include a virtual machine, computer, node, instance, host, or machine in a networked computing environment. Such networked environment, and/or cloud, may be a collection of machines connected by communication channels that facilitate communications between machines and allow for machines to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. It is to be understood in the present disclosure that the provider computing device 120 and the user computing device 110 may be any computing device operable to perform information processing and wireless communications, and the provider computing device 120 and the user computing device 110 may be a similar or the same type of computing device.

Processor (e.g., Processor 150).

Figure 2:
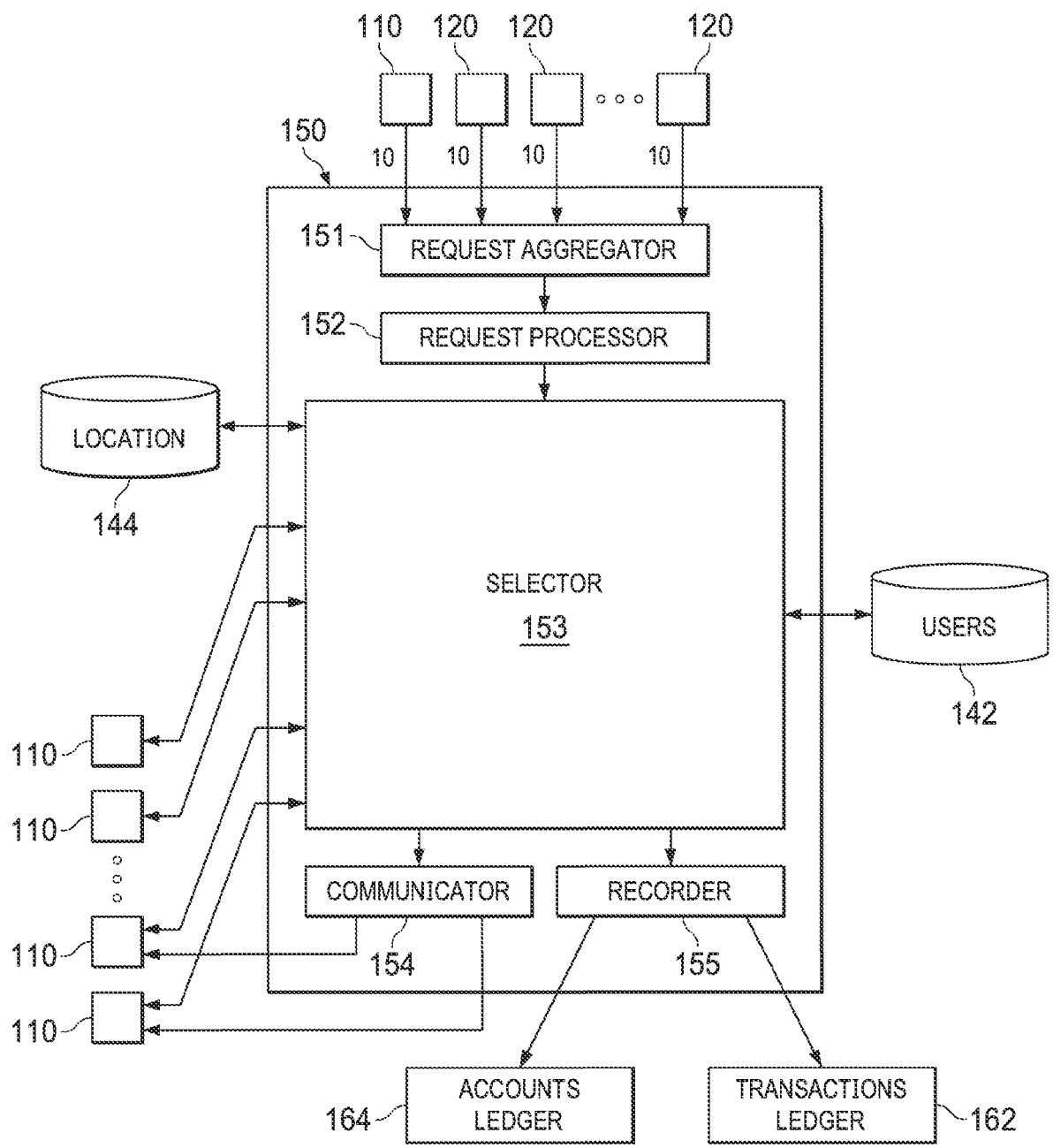
FIG. 2 is an illustration of an example embodiment of a processor, which forms a part of and/or performs a functionality of a system for managing distributed ledger data.

As illustrated in at least FIG. 1 and FIG. 2, the system 100 may include one or more processors (e.g., processor 150). An example embodiment of the processor 150 may include one or more request aggregators (e.g., request aggregator 151), one or more request processors (e.g., request processor 152), one or more selectors (e.g., selector 153), one or more communicators (e.g., communicator 154), and/or one or more recorders (e.g., recorder 155). The processor 150 may also be configurable or configured to perform one or more actions, operations, functions, functionalities, methods, and/or processes of the request aggregator 151, request processor 152, selector 153, communicator 154, and/or recorder 155.

The processor 150 (and/or its elements, as described in the present disclosure) may be any processor, server, device, computing device, controller, microprocessor, microcontroller, microchip, semiconductor device, or the like, configurable or configured to perform, among other things, a processing of information, voice and/or data communications, and/or other actions described above and in the present disclosure. Alternatively or in addition, the processor 150 (and/or its elements, as described in the present disclosure) may include and/or be a part of a virtual machine, processor, computer, node, instance, host, or machine, including those in a networked computing environment. As used in the present disclosure, such a network and/or cloud may be a collection of devices connected by communication channels that facilitate communications between devices and allow for devices to share resources. Such resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof. A network or cloud may include, but is not limited to, computing grid systems, peer to peer systems, mesh-type systems, distributed computing environments, cloud computing environment, etc. Such network or cloud may include hardware and software infrastructures configured to form a virtual organization comprised of multiple resources which may be in geographically disperse locations. Network may also refer to a communication medium between processes on the same device. Also as referred to herein, a network element, node, or server may be a device deployed to execute a program operating as a socket listener and may include software instances.

Example embodiments of the processor 150 may include or not include one or more of the elements and/or functionality described above and in the present disclosure, may include additional elements and/or functionality, may be formed and/or used in different sequences, actions, combinations, and/or configurations, and/or one or more of the elements and/or functionality (and/or elements of elements and/or functionality of elements) may be combinable into a single element, single functionality, divided into two or more elements, and/or divided into two or more functionalities. The processor 150, and elements and functionality thereof, will now be further explained with reference to the accompanying figures.

Request Aggregator (e.g., Request Aggregator 151).

The processor 150 may include and/or perform one or more functionalities of one or more request aggregators (e.g., request aggregator 151). As illustrated in FIG. 2, an example embodiment of the request aggregator 151 may be configurable or configured to aggregate one or more requests 10 received, directly or indirectly, from one or more provider computing devices 120 and/or one or more user computing devices 110. In an example embodiment, the request aggregator 151 may be configurable or configured to receive and store requests 10 for further processing by the request processor 152 and/or other elements of the processor 150.

In an example embodiment, a single request aggregator 151 may be configurable to perform the functions and operations of the request aggregator 151 described above and in the present disclosure. Alternatively or in addition, a plurality of request aggregators 151 may be configurable to perform the functions and operations of the request aggregator 151.

Request Processor (e.g., Request Processor 152).

Figure 3:
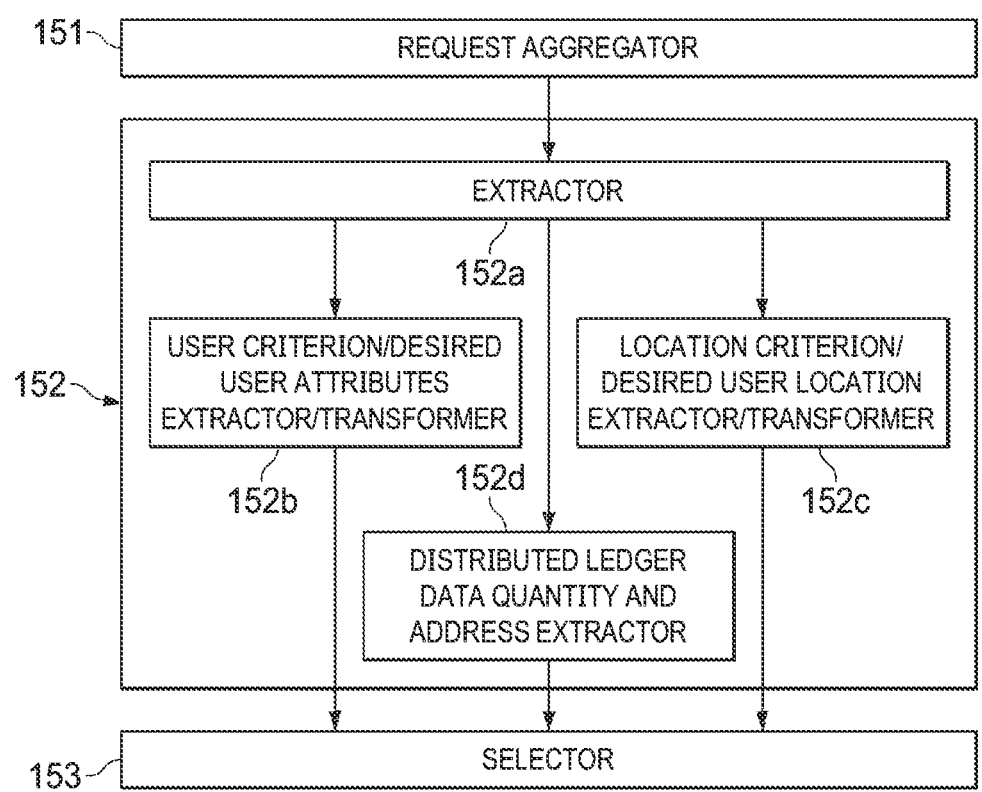
FIG. 3 is an illustration of an example embodiment of a request processor, which forms a part of and/or performs one or more functionalities of a processor.

As illustrated in at least FIG. 2 and FIG. 3, the processor 150 may include and/or perform one or more functionalities of one or more request processors (e.g., request processor 152). An example embodiment of the request processor 152 may be configurable or configured to receive or instruct the request aggregator 151 to send over one or more requests 10. The request processor 152 may be further configurable or configured to extract, filter, separate, and/or identify (hereinafter "extract") one or more aspects of the request 10. The request processor 152 may include one or more extractors 152*a*, one or more user criterion/desired user attributes extractor/transformer 152*b*, one or more location criterion/desired location extractor/transformer 152*c*, and one or more distributed ledger data quantity and address extractor 152*d*.

As a non-limiting example, the request 10 received by the request processor 152 may be a request 10 sent by a provider computing device 120 to process a selective and/or targeted recording of a transfer of a stated or unstated quantity of distributed ledger data (e.g., digital tokens or cryptocurrency) from the provider to one or more users based on one or more user criterion and/or one or more location criterion. In such an example, the request 10 received from the request aggregator 151 may undergo an extraction by extractor 152*a*. The extractor 152*a* may be configurable to extract the user criterion (or desired user attributes), location criterion (or desired user locations), and/or quantities and/or addresses of distributed ledger data (e.g., digital tokens or cryptocurrency) from the request 10, and provide the extracted information to the user criterion/desired user attributes extractor/transformer 152*b*, location criterion/desired user location extractor/transformer 152*c*, and/or distributed ledger data quantity and address extractor 152*d*, respectively. In situations where the extracted user criterion has been encrypted, compressed, and/or in a form that is not suitable for further processing, the user criterion/desired user attributes extractor/transformer 152*b* may perform a transformation of the user criterion into one or more desired user attributes. In situations where the extracted location criterion has been encrypted, compressed, and/or in a form that is not suitable for further processing, the location criterion/desired user location extractor/transformer 152*c* may perform a transformation of the location criterion into one or more desired user locations. The distributed ledger data quantity and address extractor 152*d* may be configurable or configured to identify a quantity (if specified) of distributed ledger data (e.g., digital tokens or cryptocurrencies) that the provider wishes to transfer as part of the request. In situations where a total quantity is not stated, the distributed ledger data quantity and address extractor 152*d* may be configurable to extract a quantity per user or rules/formulas to be used to determine a quantity for each user. The distributed ledger data quantity and address extractor 152*d* may also be configurable or configured to identify addresses of the distributed ledger data (e.g., digital tokens or cryptocurrencies) that the provider wishes to transfer as part of the request 10.

Selector (e.g., Selector 153).

Figure 4:
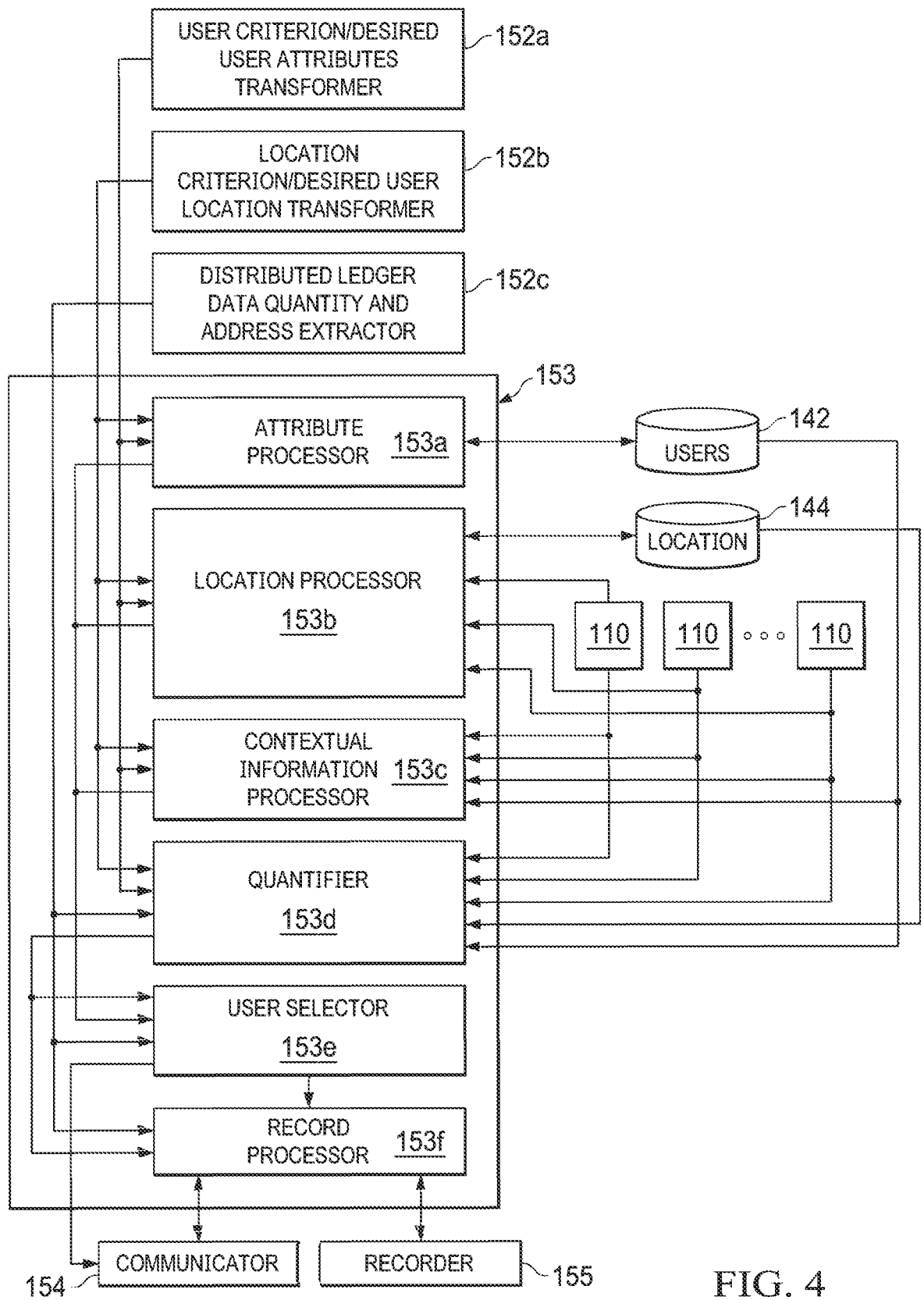
FIG. 4 is an illustration of an example embodiment of a selector, which forms a part of and/or performs one or more functionalities of a processor.

As illustrated in at least FIGS. 2-3 and FIG. 4, the processor 150 may include and/or perform one or more functionalities of one or more selectors (e.g., selector 153). An example embodiment of the selector 153 may be configurable or configured to communicate with one or more other elements of the system 100, including, but not limited to, the request processor 152, user database 142, location database 144, one or more user computing devices 110, communicator 154, recorder 155, and/or one or more distributed ledgers 162 and/or 164. The selector 153 may include one or more attribute processors 153*a*, one or more location processors 153*b*, one or more contextual information processors 153*c*, one or more quantifiers 153*d*, one or more user selectors 153*e*, and/or one or more record processors 153*f*.

In an example embodiment, the selector 153 may be configurable to receive and/or instruct the request processor 152 to send one or more extracted aspects of the request. For example, the user criterion/desired user attributes extractor/transformer 152*b* may send desired user attributes information to attribute processor 153*a*, location processor 153*b*, contextual information processor 153*c*, and/or quantifier 153*d*. The location criterion/desired user location extractor/transformer 152*c* may send desired user location information to attribute processor 153*a*, location processor 153*b*, contextual information processor 153*c*, and/or quantifier 153*d*. The distributed ledger data quantity and address extractor 152*d* may send the quantity and addresses of the distributed ledger data to quantifier 153*d*, user selector 153*e*, and/or record processor 153*f*.

The user selector 153*e* may be configurable or configured to select one or more users ("candidate users" or "selected users") from among a plurality of users stored in user database 142. In order to make the selection, the user selector 153*e* is configurable or configured to communicate with the attribute processor 153*a*, location processor 153*b*, contextual information processor 153*c*, and/or quantifier 153*d*. Each of these elements and functionality thereof will now be further described with reference to the accompanying figures.

Attributes Processor (e.g., Attributes Processor 153*a*).

As illustrated in FIG. 4, the attributes processor 153*a* may be configurable or configured to receive, as inputs, desired user attributes information from the user criterion/desired user attributes extractor/transformer 152*b*, desired user location information from the location criterion/desired user location extractor/transformer 152*c*, and/or stored user attributes from the user database 142. Based on the desired user attributes received in the request 10, the attributes processor 153*a* may perform a search in the user database 142. The attributes processor 153*a* may then be configurable or configured to select, from the user database 142, one or more candidate users. Each of the candidate users may be a user having one or more stored attributes (as stored in the user database 142) that match the one or more desired user attributes received in the request 10. In situations where stored user attributes (as stored in the user database 142) include addresses (e.g., residential address, work address, etc.), the attributes processor 153*a* may also receive desired user location information and use such information to select, from the user database 142, one or more candidate users. Each such candidate users may be a user having stored address(es) (as stored in the user database 142) that match the received desired user location information.

In some embodiments, the attributes processor 153*a* may also be configurable or configured to receive, as inputs for further processing, results from the processing by the location processor 153*b*, contextual information processor 153*c*, and/or quantifier 153*d*. For example, as described below and in the present disclosure, based on one or more desired user locations received in the request 10, the location processor 153*b* may be configurable or configured to select one or more candidate users. Each such selected candidate user may be a user having one or more current geolocations (as obtained directly from a user computing device 110) and/or one or more historic geolocations (as obtained from location database 144) that match the one or more desired user locations received in the request 10. Each such selected candidate user may then be provided to the attributes processor 153*a* as inputs, and the attributes processor 153*a* may then further select one or more selected users from among the selected candidate users. Such selecting of the one or more selected users may be based on the desired user attributes received in the request 10. Specifically, each of the selected users may be a user having one or more stored attributes (as stored in the user database 142) that match the one or more desired user attributes received in the request 10. As another example, as described below and in the present disclosure, based on one or more contextual information received directly from user computing devices 110, the contextual information processor 153*c* may be configurable or configured to select one or more candidate users. Each such selected candidate user may be a user having one or more contextual information (as obtained directly from user computing devices 110) that match the one or more desired user attributes received in the request 10. Each such selected candidate user may then be provided to the attributes processor 153*a* as inputs, and the attributes processor 153*a* may then further select one or more selected users from among the selected candidate users. Such selecting of the one or more selected users may be based on the desired user attributes received in the request 10. Specifically, each of the selected users may be a user having one or more stored attributes (as stored in the user database 142) that match the one or more desired user attributes received in the request 10.

The attribute processor 153*a* may provide the one or more candidate users (or selected users), as described above and in the present disclosure, to the location processor 153*b*, contextual information processor 153*c*, quantifier 153*d*, and/or user selector 153*e* for further processing.

Location Processor (e.g., Location Processor 153*b*).

As illustrated in FIG. 4, the location processor 153*b* may be configurable or configured to receive, as inputs, desired user location information from the location criterion/desired user location extractor/transformer 152*c*, desired user attributes information from the user criterion/desired user attributes extractor/transformer 152*b*, stored or historic user geolocations from the location database 144, and/or current user geolocations directly from the user computing devices 110. Based on the desired user location(s) received in the request 10, the location processor 153*b* may perform a search in the location database 144 and/or obtain current geolocation information from user computing devices 110. The location processor 153*b* may then be configurable or configured to select, from the location database 144 (and/or user database 142), one or more candidate users. Each of the candidate users may be a user having a current geolocation and/or one or more stored geolocations (as stored in the location database 144) that match the one or more desired user locations received in the request 10. In situations where desired user attributes (as received in the request 10) include addresses (e.g., frequented restaurants, hotels, retailers, etc.), the location processor 153*b* may also receive such desired user location information and use such information to select, from the location database 144, one or more candidate users. Each such candidate users may be a user having historic geolocations (as stored in the location database 144) that match the received desired user location information.

In some embodiments, the location processor 153*b* may also be configurable or configured to receive, as inputs for further processing, results from the processing by the attributes processor 153*a*, contextual information processor 153*c*, and/or quantifier 153*d* in a similar manner to that described for the attributes processor 153*a* and/or the contextual information processor 153*c*. For example, as described above and in the present disclosure, based on one or more desired user attributes received in the request 10, the attributes processor 153*a* may be configurable or configured to select one or more candidate users. Each such selected candidate user may be a user having one or more stored user attributes (as stored in the user database 142) that match the one or more desired user attributes received in the request 10. Each such selected candidate user may then be provided to the location processor 153*b* as inputs, and the location processor 153*b* may then further select one or more selected users from among the selected candidate users. Such selecting of the one or more selected users may be based on the desired user locations received in the request 10. Specifically, each of the selected users may be a user having a current geolocation (as obtained directly from user computing devices 110) and/or one or more historic geolocations (as stored in the location database 144) that match the one or more desired user locations received in the request 10. As another example, as described below and in the present disclosure, based on one or more contextual information received directly from user computing devices 110, the contextual information processor 153*c* may be configurable or configured to select one or more candidate users. Each such selected candidate user may be a user having one or more contextual information (as obtained directly from user computing devices 110) that match the one or more desired user attributes received in the request 10. Each such selected candidate user may then be provided to the location processor 153*b* as inputs, and the location processor 153*b* may then further select one or more selected users from among the selected candidate users. Such selecting of the one or more selected users may be based on the desired user location received in the request 10. Specifically, each of the selected users may be a user having a current geolocation (as obtained directly from user computing devices 110) and/or one or more historic geolocations (as stored in the location database 144) that match the one or more desired user locations received in the request 10.

In an example embodiment, the location processor 153b may also be configurable or configured to select one or more target locations. The one or more target locations may be the same as, similar to, or different from the desired user locations in the request 10. In example embodiments, the one or more target locations may be locations where a user needs to physically visit or be present at in order to receive a transfer of distributed ledger data (e.g., digital tokens, cryptocurrencies, etc.). In respect to a user visiting such target locations, the user may be required to send a geolocation of the user to the processor 150 via the user computing device 110 so as to confirm that the user has indeed visited the target location. Alternatively or in addition, the user computing device 110 of the user may be configurable or configured to automatically send geolocation information (either once, periodically, intermittently, continuously, in real-time, and/or upon a certain action such as launching an application), in which case the user may not need to do anything to send his/her geolocation.

It is recognized in the present disclosure that example embodiments of the system 100 and its elements may be configurable or configured to enable providers the flexibility and power to implement new targeted or selective marketing campaigns/strategies, new targeted or selective advertising campaigns/strategies, new targeted or selective promotional offerings of distributed ledger data (e.g., digital tokens, cryptocurrency, etc.) as incentives and/or rewards replacing traditional points (airmiles, loyalty points, etc.), and/or new gamification of one or more of the aforementioned.

The location processor 153b may provide the one or more candidate users (or selected users), as described above and in the present disclosure, to the attributes processor 153a, contextual information processor 153c, quantifier 153d, and/or user selector 153e for further processing.

Contextual Information Processor (e.g., Contextual Information Processor 153c).

As illustrated in FIG. 4, the contextual information processor 153c may be configurable or configured to receive, as inputs, desired user attributes information from the user criterion/desired user attributes extractor/transformer 152b, desired user location information from the location criterion/desired user location extractor/transformer 152c, contextual information directly from user computing devices 110, and/or stored user attributes from the user database 142. Based on the desired user attributes received in the request 10, the contextual information processor 153c may select, from among the user computing devices 110 that provided the contextual information, one or more candidate users. Each of the candidate users may be a user having a user computing device 110 that provided one or more contextual information that match the one or more desired user attributes received in the request 10.

In some embodiments, the contextual information processor 153c may also be configurable or configured to receive, as inputs for further processing, results from the processing by the attributes processor 153a, location processor 153b, and/or quantifier 153d in a similar manner to that described for the attributes processor 153a and/or location processor 153b. For example, as described above and in the present disclosure, based on one or more desired user locations received in the request 10, the location processor 153b may be configurable or configured to select one or more candidate users. Each such selected candidate user may be a user having one or more current geolocations (as obtained directly from a user computing device 110) and/or one or more historic geolocations (as obtained from location database 144) that match the one or more desired user locations received in the request 10. Each such selected candidate user may then be provided to the contextual information processor 153c as inputs, and the contextual information processor 153c may then further select one or more selected users from among the selected candidate users. Such selecting of the one or more selected users may be based on the desired user attributes received in the request 10. Specifically, each of the selected users may be a user having a user computing device 110 that provided one or more contextual information that match the one or more desired user attributes received in the request 10. As another example, as described above and in the present disclosure, based on one or more desired user attributes received in the request 10, the attributes processor 153a may be configurable or configured to select one or more candidate users. Each such selected candidate user may be a user having one or more stored user attributes (as obtained from the user database 142) that match the one or more desired user attributes received in the request 10. Each such selected candidate user may then be provided to the contextual information processor 153c as inputs, and the contextual information processor 153c may then further select one or more selected users from among the selected candidate users. Such selecting of the one or more selected users may be based on the desired user attributes received in the request 10. Specifically, each of the selected users may be a user having a user computing device 110 that provided one or more contextual information that match the one or more desired user attributes received in the request 10.

The contextual information processor 153c may provide the one or more candidate users (or selected users), as described above and in the present disclosure, to the attributes processor 153a, location processor 153b, quantifier 153d, and/or user selector 153e for further processing.

Quantifier (e.g., Quantifier 153d).

As illustrated in FIG. 4, the quantifier 153d may be configurable or configured to receive, as inputs, distributed ledger data quantity information from the distributed ledger data quantity and address extractor 152d, desired user attributes information from the user criterion/desired user attributes extractor/transformer 152b, desired user location information from the location criterion/desired user location extractor/transformer 152c, contextual information directly from user computing devices 110, stored user attributes from the user database 142, current geolocation information directly from user computing devices 110, historic geolocation information from location database 144, and/or candidate users and/or selected users selected from the attributes processor 153a, location processor 153b, and/or contextual information processor 153c. Based on the distributed ledger data quantity requirements received in the request 10, the quantifier 153d may select a quantity of distributed ledger data to be transferred to each selected user (and/or candidate user). For example, in a situation where the distributed ledger data quantity requirements stipulate an equal distribution of distributed ledger data and a total quantity of distributed ledger data to transfer, example embodiments of the quantifier 153d may be configurable or configured to determine the quantity of distributed ledger data to transfer to each selected user (and/or candidate user) upon receiving the selected users (and therefore a quantity of selected users) from the attribute processor 153a, location processor 153b, contextual information processor 153c, and/or user selector 153e. As another example, in a situation where the distributed ledger data quantity requirements stipulate an unequal, weighted, and/or preferential quantity of distributed ledger data to transfer to certain selected users (and/or candidate user) based on a specified condition (e.g., the provider is an electronics retailer, and offers double quantity of distributed ledger data to users who are female, aged between 30-35 years of age, etc.), example embodiments of the quantifier 153*d* may be configurable or configured to allocate and/or provisionally assign/reserve such quantities to such users who meet the specified conditions upon receiving the selected users from the attribute processor 153*a*, location processor 153*b*, contextual information processor 153*c*, and/or user selector 153*e*.

The quantifier 153*d* may then send the determined quantities of the distributed ledger data to be transferred and identification of which users will receive different quantities (if applicable) to the user selector 153*e* and/or record processor 153*f* for further processing.

User Selector (e.g., User Selector 153*e*).

As illustrated in FIG. 4, the user selector 153*e* may be configurable or configured to receive, as inputs, certain information (e.g., distributed ledger data quantity information) from the distributed ledger data quantity and address extractor 152*d*, certain information (e.g., determined quantities of the distributed ledger data to be transferred) from the quantifier 153*d*, and/or certain information (e.g., possible users, candidate users, selected users, and/or final users selected) from the attributes processor 153*a*, location processor 153*b*, contextual information processor 153*c*, and/or quantifier 153*d*.

In example embodiments, the user selector 153*e* may perform one or more of the operations, functions, and/or actions performable by the attributes processor 153*a*, location processor 153*b*, contextual information processor 153, and/or quantifier 153*d* (e.g., selecting of desired user attributes; selecting of contextual information; selecting of candidate users, selected users, and/or final users; selecting of quantities to be transferred; selecting of desired user locations; selecting of target locations; etc.). Alternatively or in addition, the attributes processor 153*a*, location processor 153*b*, contextual information processor 153, and/or quantifier 153*d* may perform one or more of the operations, functions, and/or actions of the user selector 153*e* (e.g., selecting of candidate users, selected users, and/or final users; instructing or coordinating with the communicator 154 to send notifications to user computing devices 110; instructing or coordinating with the record processor 153*f* to generate transfer records and send such transfer records to the recorder 155 to record in a distributed ledger).

It is recognized in the present disclosure that functionality, operation, use, and/or non-use of one or more of the aforementioned elements may depend on, among other things, the contents of the request 10. For example, in situations where only certain desired user attributes are provided in the request 10, the attribute processor 153*a* may select candidate users (or selected users or final users) with little or no involvement from the location processor 153*b* and/or contextual information processor 153*c*. In such a case, there may not be a need for the attribute processor 153*a* to interact with the user selector 153*e*, and instead the attribute processor 153*a* may interact directly with the communicator 154 and/or record processor 153*f*. As another example, in situations where the attribute processor 153*a* and location processor 153*b* (and/or other elements) are processing a selection of candidate users cooperatively, collaboratively, dependently upon one another, and/or in sequence, there may only be one final or common/identical output (i.e., selected users) from the attribute processor 153*a* and/or location processor 153*b*, in which case such final or common/identical output (i.e., selected users) may be provided directly to the communicator 154 and/or record processor 153*f*. However, in situations where the attribute processor 153*a* and location processor 153*b* (and/or other elements) are processing a selection of candidate users in "parallel" or independently from one another (e.g., as compared to processing a selection of candidate users in "series," such as having the attributes processor 153*a* first perform a first selection of candidate users based on desired user attributes, followed by sending such selected candidate users from the attributes processor 153*a* to the location processor 153*b* to further filter or select from such selected candidate users based on desired user location, or vice versa), the user selector 153*e* may receive two or more separate and independently processed sets of candidate users (e.g., one set from the attributes processor 153*a* and another set from the location processor 153*b*) and may then be required to select one or more final users from among the two or more separate sets of candidate users.

Accordingly, based on one or more of the inputs, the user selector 153*e* may be configurable or configured to select one or more final users (or candidate users or selected users) who will be offered distributed ledger data (e.g., via a notification, as sent by the communicator 154, having an interactive option to accept or not accept the offer, perform or not perform a certain action, etc.), along with a quantity of distributed ledger data to be transferred to each of the one or more final users. The selected one or more final users and associated quantities for each are then sent to the communicator 154.

Record Processor (e.g., Record Processor 153*f*), Communicator (e.g., Communicator 154), and Recorder (e.g., Recorder 155).

In an example embodiment, the communicator 154 may be configurable or configured to receive the selected one or more final users (or candidate users or selected users) from the user selector 153*e* (or directly from the attribute processor 153*a*, location processor 153*b*, contextual information processor 153*c*, and/or quantifier 153*d*). The communicator 154 may be configurable or configured to perform a sending of a notification to each of the final users. In an example embodiment, the notification is pushed to the user computing device 110 of each final user, and displayed in part or in whole on the user computing device 110. The notification may be in one or more forms, such as a notification on the lock screen of the user computing device 110 (when the user computing device 110 is locked), a pop-up notification, a banner notification (e.g., banners in Apple iOS-running devices), an alert notification (e.g., alerts in Apple iOS-running devices), a badge notification, an email, an SMS, a chat message, or the like. The notification may include an explanation of the offer to receive a certain quantity of distributed ledger data. The notification may also include an interactive option, and/or a notice to click on a link or go to a certain mobile application to access the interactive option. The interactive option may include a option to accept or not accept the transfer of the distributed ledger data. Upon a user interacting with the interactive option so as to accept the offer for the transfer of the distributed ledger data, a response is sent, from the user computing device 110 to the communicator 154. The communicator 154 may then notify the user selector 153*e* and/or record processor 153*f* of the acceptance.

The record processor 153*f* may be configurable or configured to perform a processing to prepare for the transfer of distributed ledger data. In an example embodiment, the record processor 153f may be configurable to prepare a transfer record, or the like, for the transfer of the distributed ledger data, and associated quantity thereof, from the provider to the final user that accepted the offer. The transfer record may include, among other things, the address of the provider (sender or current owner of the distributed ledger data), the address of the final user (recipient), and quantity of the distributed ledger data to be transferred. The record processor 153f may then be configurable or configured to send the results of the preparing of the transfer record to the recorder 155.

In an example embodiment, the recorder 155 may be configurable or configured to receive the prepared transfer record from the record processor 153f and perform a recording of the transfer record in a distributed ledger (e.g., transaction ledger 162) in a manner known by persons of ordinary skill in the art.

It is to be understood in the present disclosure that the user database 142 may be, include, and/or work with a distributed ledger (e.g., accounts ledger 164) without departing from the teachings of the present disclosure.

Example Embodiments of a Method of Managing Distributed Ledger Data (e.g., Method 500).

Figure 5:
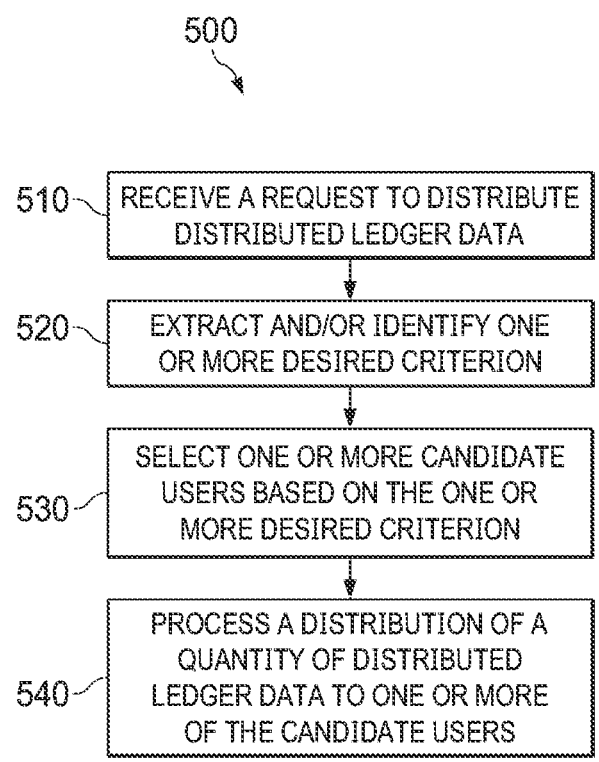
FIG. 5 is an illustration of an example embodiment of a method of managing distributed ledger data.

As illustrated in FIG. 5, an example embodiment of a method (e.g., method 500) of managing distributed ledger data may include establishing a communication channel between a processor (e.g., processor 150) and a computing device of a provider (e.g., provider computing device 120). The method 500 may also include receiving a request (e.g., request 10) to distribute or transfer distributed ledger data (e.g., digital tokens, cryptocurrency, etc.) (e.g., action 510). The method 500 may also include extracting and/or identifying one or more criterion from the request (e.g., action 520). The method 500 may also include selecting one or more candidate users (or selected users or final users) based on the one or more desired criterion (e.g., action 530). The method 500 may also include processing a distribution or transfer of a quantity of distributed ledger data to one or more of the candidate users (or selected users or final users) (e.g., action 540).

Example embodiments of the method 500 may include or not include one or more of the actions described above and in the present disclosure, may include additional actions, operations, and/or functionality, may be performed in different sequences and/or combinations, and/or one or more of the actions, operations, and/or functionality may be combinable into a single action, operation, and/or functionality and/or divided into two or more actions, operations, and/or functionalities. The method 500, and elements and functionality thereof, will now be further explained with reference to the accompanying figures.

Establishing a Communication Channel.

In an example embodiment, the method 500 may include establishing one or more communication channels between a processor (e.g., processor 150) and a computing device of a provider (e.g., provider computing device 120). The communication channel may be any communication channel known in the art including, but not limited to, those pertaining to wireless and/or wired communications, secured or unsecured communications, encrypted or unencrypted communications, etc.

Receiving a Request (e.g., Action 510).

As illustrated in FIG. 5, an example embodiment of the method 500 may include receiving a request (e.g., action 510). The request (e.g., request 10) may be a request originating from the provider computing device 120 and received at or by the processor 150. The request 10 may be received via the established communication channel. The request 10 may be a request to transfer or distribute a specified or unspecified quantity of distributed ledger data (e.g., digital tokens, cryptocurrencies, etc.), as described in the present disclosure. The request 10 may also be a request for the processor 150 to process a selective or targeted transfer or distribution of a specified or unspecified quantity of distributed ledger data, as described in the present disclosure. The request 10 may also be a request for the processor 150 to process a recording (e.g., selective or targeted recording) of a transfer or distribution (e.g., selective or targeted transfer or distribution) of a specified or unspecified quantity of distributed ledger data, as described in the present disclosure. The request 10 may be a request to transfer from the provider to one or more users based on one or more criterion. For example, the one or more criterion may include one or more user criterion (or desired user attributes) and/or one or more location criterion (or desired user location). Other criterion are also contemplated without departing from the teachings of the present disclosure. For example, the one or more criterion may also be based on desired attributes and/or desired locations of other users (e.g., users related to a particularly selected user, users having a common employer as the particularly selected user, users living at a same or nearby address to the particularly selected user, etc.). In such an example, although a particularly selected user may not have/possess stored attributes (and/or contextual information) matching the desired user attributes and/or may not have current and/or historic geo-locations matching the desired user locations, there may be a possibility and/or likelihood that the particularly selected user may know of someone else (i.e., other user) who has/possesses attributes matching such desired user attributes and/or frequents locations (and/or is current at a location or is planning to be at a location) matching such desired user locations. In such a case, the user computing device 110 of the particularly selected user may be configurable or configured to send, notify, and/or transfer his/her right to receive a transfer of distributed ledger data (e.g., digital tokens, cryptocurrency, etc.) to such other user. And in such case, the processor 150 may be configurable or configured to process a transfer of such rights from the particularly selected user to the other user (which, as will be further described in the present disclosure, may include cancelling, deleting, or rescinding the offer to the particularly selected user and sending a new notification (along with an interactive option) to the other user).

Desired user attributes may include, but are not limited to, user demographics, user interests, user preferences, user relationships, user employment, user affiliations, user social media interactions, user information publicly available on the Internet and/or social networks, etc., and more specifically, a name (e.g., first name, last name, middle name, alias, and/or login name); email address; social media name, alias, or handle; address (e.g., residential address, work address, etc.); citizenship; residency; passport; drivers license; national ID card; credit cards; debit cards; bank information; electronic wallet; phone (e.g., mobile phone, home phone, work phone, facsimile, Skype, Facetime, WhatsApp, etc.); Ethereum address; Bitcoin address; employment (e.g., company/organization, etc.); job title; profession; industry; salary; references; biometric information (e.g., finger print, retina, face, etc.); cryptocurrency trading risk tolerance; sex; marital status; social network; family members; education; educational institution; date of birth; religion; interests; political interests; other interests (e.g., sports, technology, arts, music, movies, television shows, etc.); preferences; spending preferences (e.g., food, beverage, technology, fashion, travel, transportation, etc.); method of payment preferences (e.g., cash, credit card, debit card, digital tokens, cryptocurrencies, etc.); other preferences (e.g., preferred method of communication, preferred transportation type, preferred places to shop and visit, etc.); etc.

Desired user locations may be any location desired by the provider. For example, if the provider is a chain of coffee shops, the desired user locations may be in and/or nearby to some or each of the coffee shops. The desired user locations for such an example may also be in and/or nearby to one or more competitor shops, one or more educational institutions, one or more office buildings, etc. As another example, if the provider is an airline, the desired user locations may be in and/or nearby to hotels, tourist destinations, airports, office buildings, etc.

Performing a First Selection Process (e.g., Actions 520 and 530).

In an example embodiment, the method 500 may include performing a first selection process. The first selection process may be performed by the processor 150. The first selection process may include extracting, from the request 10, one or more criterion. The one or more user criterion may include user criterion, such as desired user attributes. The first selection process may also include transforming the one or more user criterion into one or more desired user attributes. In situations where the extracted user criterion has been encrypted, compressed, and/or in a form that is not suitable for further processing, the first selection process may need to transform the user criterion into one or more desired user attributes. The first selection process may also include searching a database (e.g., user database 142). The searching may be for one or more registered or unregistered users. The database may include a plurality of registered users (or unregistered users) and a plurality of stored attributes for each registered user (and each unregistered user, if applicable). The first selection process may also include selecting, from the database, one or more candidate users. Each candidate user may be a registered user having one or more stored attributes that match the one or more desired user attributes.

Performing a Second Selection Process (e.g., Actions 520 and 530).

In an example embodiment, the method 500 may include performing a second selection process. The second selection process may be performed by the processor 150. The second selection process may include extracting, from the request 10, one or more criterion. The one or more user criterion may include location criterion, such as desired user locations. The desired user locations may be stipulated to be current (or real-time locations) and/or historic (or stored) locations, and may also include a threshold tolerance such as threshold distance, threshold area, threshold range or signal level (e.g., when determining using a wireless signal such as Wi-Fi signals, Bluetooth signals, audio signals, etc.) to indicate a match. The second selection process may also include transforming the one or more location criterion into one or more desired user locations. In situations where the extracted location criterion has been encrypted, compressed, and/or in a form that is not suitable for further processing, the second selection process may perform a transformation of the location criterion into one or more desired user locations. The second selection process may also include communicating, between the processor 150 and a computing device of each of the candidate users (e.g., user computing device 110). The communicating may include obtaining, by the processor 150, a geolocation of each user computing device 110. The geolocation obtained may be a current (or real-time) geolocation and/or historic (or stored) geolocation. The second selection process may also include selecting, from among the one or more candidate users, one or more selected users. A candidate user may be selected as one of the selected users when the geolocation (e.g., current geolocation and/or historic geolocation) for the candidate user (e.g., geolocation of the computing device of that candidate user) is within at least a threshold distance from at least one of the desired user locations.

Sending a Notification (e.g., Action 540).

The method 500 may also include sending (e.g., pushing) a notification (as described in the present disclosure) from the processor 150 to a computing device 110 of one or more selected users (or candidate users or final users). The notification may include information and/or an interactive option to accept a transfer of distributed ledger data (e.g., digital tokens, cryptocurrency, etc.) from the provider. Alternatively or in addition, the notification may include an interactive option to not accept (or decline) the transfer of distributed ledger data from the provider. Alternatively or in addition, the notification may include an interactive option to accept a recording, in a distributed ledger, of the transfer of a first quantity of distributed ledger data (e.g., digital tokens, cryptocurrency, etc.) from the provider.

In an example embodiment, the notification may be sent as a push notification to a user computing device 110 of the selected user (or candidate user or final user), or provided in one or more other ways as described in the present disclosure and/or known in the art. Once the notification is pushed to the user computing device 110, the notification may be displayed in part or in whole on the user computing device 110. The displaying of the notification may be in one or more forms, such as in the form of a notification on the lock screen of the user computing device 110 (when the user computing device 110 is locked), a pop-up notification, a banner notification (e.g., banners in Apple iOS-running devices), an alert notification (e.g., alerts in Apple iOS-running devices), a badge notification, an email, an SMS, a chat message, or the like. The notification may include an explanation of the offer to receive a certain quantity of distributed ledger data. The notification may also include an interactive option, and/or a notice to click on a link or go to a certain mobile application to access the interactive option. The interactive option may include an option to accept or not accept the transfer of the distributed ledger data. Alternatively or in addition, the interactive option may include an option to transfer the notification to one or more other users (e.g., a user who receives a notification for free digital tokens from a cosmetics retailer may not be interested in cosmetics, but may want to transfer this notification to another user, such as the user's wife or husband, sister or brother, daughter or son, friend, or colleague, who may be interested in the free digital tokens; a user who receives a notification for free digital tokens from a pet store may no longer have any pets, in which case the user may want to transfer this notification to another user who has pets). Alternatively or in addition, the interactive option may include an option to suggest and/or refer one or more other users that may be interested in the notification.

When a user interacts with the interactive option in a manner that represents an acceptance or non-acceptance of the transfer of the distributed ledger data, a response may be sent from the user computing device 110 to the communicator 154. Alternatively or in addition, if the interactive option has a time element (e.g., expiry date/time), a response may be sent to the communicator 154 after satisfying such time element (or one or more elements of the processor 150 may keep track of such time element and notify the communicator 154 after satisfying such time element; or the communicator 154 may keep track of such time element itself).

When the communicator 154 receives a response indicative of an acceptance of the transfer of the distributed ledger data, the communicator 154 may be configurable or configured to notify the user selector 153e and/or record processor 153f of such acceptance and/or request and/or instruct the user selector 153e and/or record processor 153f to perform further processing. Alternatively or in addition, the communicator 154 may update the selected user's information stored in the users database 142, location database 144, other databases, and/or other distributed ledgers to confirm, validate, and/or update the selected user's stored attributes (e.g., from the previous example, validating the selected user's stored attributes of "have pets" as being true or confirmed on a specific date/time). Future searches pertaining to such validated user attribute(s) by the attribute processor 153a, location processor 153b, contextual information processor 153c, and/or user selector 153e may then prioritize a selection of such user over other users who may not have such attribute as being validated.

On the other hand, when the communicator 154 receives a response indicative of a non-acceptance (e.g., rejection or lapse of a time element) of the transfer of the distributed ledger data, the communicator 154 may be configurable or configured to notify the user selector 153e, attribute processor 153a, location processor 153b, contextual information processor 153e, and/or quantifier 153d of such non-acceptance and/or request and/or instruct the user selector 153e, attribute processor 153a, location processor 153b, contextual information processor 153e, and/or quantifier 153d to provide a replacement or additional candidate user (or selected user or final user). Alternatively or in addition, the communicator 154 may delete, cancel, and/or revoke the notification sent to the notification. Alternatively or in addition, the communicator 154 may update the selected user's information stored in the users database 142, location database 144, other databases, and/or other distributed ledgers to reflect the change in the selected user's stored attributes (e.g., from the previous example, updating the selected user's stored attributes from "have pets" to "no pets").

In a situation where the communicator 154 receives a response indicative of a transfer, recommendation, suggestion, and/or referral to one or more other users (either registered or unregistered user), the communicator 154 may proceed to send one or more new notifications (along with associated interactive options) to the one or more other users. Alternatively or in addition, the communicator 154 may delete, cancel, and/or revoke the notification (and offer) sent to the selected user (e.g., in the case of a transfer response). Alternatively or in addition, the communicator 154 may notify the user selector 153e, attribute processor 153a, location processor 153b, contextual information processor 153e, and/or quantifier 153d of such response and/or request and/or instruct the user selector 153e, attribute processor 153a, location processor 153b, contextual information processor 153e, and/or quantifier 153d to perform further processing. Such further processing may include, but is not limited to, confirming or checking whether the other user has stored attributes (if any), contextual information (if any or if accessible), and/or current and/or historic geolocation (if any) that match the desired user attributes and/or desired user location. Such further processing may also include, but is not limited to, updating the other user's information stored in the user database 142, location database 144, other databases, and/or one or more distributed ledgers (e.g., from the previous example, updating the other user's stored attributes from "no pets" to "have pets").

Recording the Transaction (e.g., Action 540).

In an example embodiment, the method 500 may include determining whether the processor 150 receives a response, from the user computing device 110 that received the notification, indicative of the selected user accepting the transfer of distributed ledger data and/or recording of the transfer of the first quantity of distributed ledger data from the provider to the first selected user. When the processor 150 receives a response (to the notification) from the user computing device 110 of the selected users indicating an acceptance of the transfer of the first quantity of distributed ledger data (e.g., digital tokens, cryptocurrency, etc.), the method 500 may include processing, by the processor 150 (i.e., record processor 153f), a transfer record for the transfer of the first quantity of distributed ledger data from the provider to the selected user. Alternatively or in addition, when the processor 150 receives a response (to the notification) from the user computing device 110 of the selected users indicating an acceptance of the transfer of the first quantity of distributed ledger data, the method 500 may also include recording, by the processor in a distributed ledger, the transfer record.

Example Embodiment 1

In an example embodiment, a method (e.g., method 500) of managing distributed ledger data may include establishing a communication channel between a processor (e.g., processor 150) and a computing device of a provider (e.g., provider computing device 120). The method 500 may also include receiving, at the processor 150 from the provider computing device 120, a communication request (e.g., request 10). The communication request 10 may be a request to process a recording of a transfer or distribution of distributed ledger data (e.g., digital tokens, cryptocurrency, etc.) from the provider to one or more users based on one or more user criterion and one or more location criterion.

The method 500 may also include performing, by the processor 150, a first selection process. The first selection process may include extracting, from the communication request 10, the one or more user criterion. The first selection process may also include transforming the one or more user criterion into one or more desired user attributes. The first selection process may also include searching a database (e.g., users database 142), the database 142 having a plurality of registered users and a plurality of stored attributes for each registered user. The first selection process may also include selecting, from the database 142, one or more candidate users. Each candidate user may be a registered user having one or more stored attributes that match the one or more desired user attributes.

The method 500 may also include performing, by the processor 150, a second selection process. The second selection process may include extracting, from the communication request 10, the one or more location criterion. The second selection process may also include transforming the one or more location criterion into one or more desired user locations. The second selection process may also include communicating, between the processor 150 and a computing device (e.g., user computing device 110) of each candidate user. The communicating may include obtaining, by the processor 150, a current and/or historic geolocation of each candidate user and/or the computing device 110 of each candidate user. The second selection process may also include selecting, from among the one or more candidate users, one or more selected users. A candidate user may be selected as one of the selected users when the current and/or historic geolocation of the computing device 110 of that candidate user is within at least a threshold distance from at least one of the desired user locations.

The method 500 may also include sending and/or pushing, from the processor 150 to a computing device 110 of a first selected user, a notification. The notification may include an interactive option to accept a recording of a transfer of a first quantity of distributed ledger data from the provider to the first selected user. The first selected user may be one of the selected users.

Responsive to receiving, by the processor 150 from the computing device 110 of the first selected user, a response indicative of accepting the recording of the transfer of the first quantity of distributed ledger data from the provider to the first selected user, the method 500 may also include processing, by the processor 150, a transfer record for the recording of the transfer of the first quantity of distributed ledger data from the provider to the first selected user. Responsive to receiving, by the processor 150 from the computing device 110 of the first selected user, a response indicative of accepting the recording of the transfer of the first quantity of distributed ledger data from the provider to the first selected user, the method 500 may also include recording, by the processor 150 in a distributed ledger, the transfer record.

Example Embodiment 2

In an example embodiment, a method (e.g., method 500) of managing distributed ledger data may include receiving, by a processor (e.g., processor 150), a request (e.g., request 10) to process a selective or targeted distribution or transfer of distributed ledger data (e.g., digital tokens, cryptocurrency, etc.). The method 500 may also include extracting, by the processor 150, one or more desired user attributes from the request 10. The method 500 may also include searching, by the processor 150, a database (e.g., users database 142). The database 142 may include a plurality of users and a plurality of stored attributes for each user. The method 500 may also include selecting, by the processor 150, one or more candidate users. Each candidate user may be a user having one or more stored attributes matching the one or more desired user attributes. The method 500 may also include communicating, between the processor 150 and a computing device (e.g., user computing device 110) of each candidate user. The communicating may include obtaining, by the processor 150, geolocation information of the computing device 110 of each candidate user. The method 500 may also include determining, by the processor 150, one or more target locations. Responsive to the processor 150 obtaining, from a computing device 110 of a first candidate user (the first candidate user being one of the candidate users), geolocation information of the computing device 110 of the first candidate user indicative of the first candidate user being and/or having been present at one of the target locations, the method 500 may include processing, by the processor 150, a distribution of a quantity of distributed ledger data to the first candidate user.

Example Embodiment 3

In an example embodiment, a method (e.g., method 500) of managing distributed ledger data may include receiving, at a processor (e.g., processor 150), a request (e.g., request 10) to distribute distributed ledger data (e.g., digital tokens, cryptocurrency, etc.). The method 500 may also include extracting, by the processor 150, one or more desired user attributes from the request 10. The method 500 may also include searching, by the processor 150, a database (e.g., users database 142). The database 142 may include a plurality of users and a plurality of stored attributes for each user. The method 500 may also include selecting, by the processor 150, a first candidate user and second candidate user. Each of the first and second candidate users may have one or more stored attributes that match the one or more desired user attributes.

The method 500 may also include determining, by the processor 150, a first set of target locations. The first set of target locations may be target locations selected for the first candidate user. The method 500 may also include determining, by the processor 150, a second set of target locations. The second set of target locations may be target locations selected for the second candidate user. The second set of target locations may be different from the first set of target locations, may share one or more common target locations, or may have the same target locations.

Responsive to the processor 150 obtaining, from a computing device (e.g., computing device 110) of the first candidate user, geolocation information of the computing device 110 of the first candidate user matching a target location in the first set of target locations, the method 500 may include processing, by the processor 150, a distribution of a first quantity of distributed ledger data to the first candidate user. Responsive to the processor 150 obtaining, from a computing device 110 of the second candidate user, geolocation information of the computing device 110 of the second candidate user matching a target location in the second set of target locations, the method 500 may include processing, by the processor 150, a distribution of a second quantity of distributed ledger data to the second candidate user.

Example Embodiment 4

In an example embodiment, a method (e.g., method 500) of managing distributed ledger data (e.g., digital tokens, cryptocurrency, etc.) may include receiving, at a processor (e.g., processor 150), a request (e.g., request 10) to distribute distributed ledger data. The method 500 may also include extracting, by the processor 150, one or more target locations and one or more desired user attributes from the request 10. The method 500 may also include communicating, between the processor 150 and computing devices (e.g., user computing device 110) of a plurality of users. The communicating may include obtaining, by the processor 150, geolocation information of the computing device 110 of each user. The method 500 may also include processing, by the processor 150, the obtained geolocation information, including a geolocation of a computing device 110 of a first candidate user.

Responsive to the processor 150 determining that the geolocation of the computing device 110 of the first candidate user is within a threshold distance of one of the target locations, the method 500 may also include searching a database (e.g., users database 142) for stored attributes of the first candidate user, comparing the stored attributes of the first candidate user to the one or more desired user attributes; and providing a quantity of the distributed ledger data to the first candidate user when one or more stored attributes of the first candidate user matches one or more of the desired user attributes.

Example Embodiment 5

In an example embodiment, a method (e.g., method 500) of managing distributed ledger data (e.g., digital tokens, cryptocurrency, etc.) may include identifying, by a processor (e.g., processor 150), one or more desired user attributes. The method 500 may also include searching, by the processor 150, a database (e.g., user database 142). The database 142 may include a plurality of users and a plurality of stored attributes for each user. The method 500 may also include selecting, by the processor 150 from the database 142, one or more candidate users. Each candidate user may be a user having one or more stored attributes that match the one or more desired user attributes. The method 500 may also include processing, by the processor 150, a distribution of one or more distributed ledger data to one or more of the candidate users.

Example Embodiment 6

In an example embodiment, a method (e.g., method 500) of managing distributed ledger data (e.g., digital tokens, cryptocurrency, etc.) may include identifying, by a processor (e.g., processor 150), one or more desired user attributes. The method 500 may also include obtaining, by the processor 150, contextual information associated with one or more historic interactions between a first user and a computing device (e.g., user computing device 110) of the first user. The method 500 may also include processing, by the processor 150, a distribution of one or more digital tokens to the first user when the contextual information matches the desired user attributes.

Example Embodiment 7

In an example embodiment, a method (e.g., method 500) of managing distributed ledger data (e.g., digital tokens, cryptocurrency, etc.) may include receiving, at a processor (e.g., processor 150), a request (e.g., request 10) to distribute digital tokens. The method 500 may also include extracting, from the request 10, one or more target locations. The method 500 may also include communicating, between the processor 150 and computing devices (e.g., user computing device 110) of a plurality of users. The communicating may include obtaining, by the processor 150, geolocation information of the computing device 110 of each user. The method 500 may also include processing, by the processor 150, the obtained geolocation information, including a geolocation of a computing device 110 of a first candidate user. Responsive to the processor 150 determining that the geolocation of the computing device 110 of the first candidate user is within a threshold distance of one of the target locations, the method 500 may also include processing, by the processor 150, a distribution of one or more distributed ledger data to the first candidate user.

While various embodiments in accordance with the disclosed principles have been described above, it should be understood that they have been presented by way of example only, and are not limiting. Thus, the breadth and scope of the example embodiments described in the present disclosure should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

For example, "communication," "communicate," "connection," "connect," "call," "calling," or other similar terms should generally be construed broadly to mean a wired, wireless, and/or other form of, as applicable, connection between elements, devices, computing devices, telephones, processors, controllers, servers, networks, telephone networks, the cloud, and/or the like, which enable voice and/or data to be sent, transmitted, broadcasted, received, intercepted, acquired, and/or transferred (each as applicable).

As another example, "user," "candidate user," "selected user," "final user," or similar terms should generally be construed broadly to mean a user, either registered or unregistered, who has been selected by one or more elements of the processor (e.g., processor 150), and such user may be a selected user subject to further processing by one or more elements of the processor or a selected user who will receive an offer (e.g., via a notification) to receive distributed ledger data (e.g., digital tokens, cryptocurrency, etc.).

Also, as referred to herein, a processor, device, computing device, telephone, phone, server, gateway server, communication gateway server, and/or controller, may be any processor, computing device, and/or communication device, and may include a virtual machine, computer, node, instance, host, or machine in a networked computing environment. Also as referred to herein, a network or cloud may be or include a collection of machines connected by communication channels that facilitate communications between machines and allow for machines to share resources. Network may also refer to a communication medium between processes on the same machine. Also as referred to herein, a network element, node, or server may be a machine deployed to execute a program operating as a socket listener and may include software instances.

Database (or memory or storage) may comprise any collection and/or arrangement of volatile and/or non-volatile components suitable for storing data. For example, memory may comprise random access memory (RAM) devices, read-only memory (ROM) devices, magnetic storage devices, optical storage devices, solid state devices, and/or any other suitable data storage devices. In particular embodiments, database may represent, in part, computer-readable storage media on which computer instructions and/or logic are encoded. Database may represent any number of memory components within, local to, and/or accessible by a processor and/or computing device.

Various terms used herein have special meanings within the present technical field. Whether a particular term should be construed as such a "term of art" depends on the context in which that term is used. Such terms are to be construed in light of the context in which they are used in the present disclosure and as one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings and topic headings herein are provided for consistency with the suggestions under various patent regulations and practice, or otherwise to provide organizational cues. These headings shall not limit or characterize the embodiments set out in any claims that may issue from this disclosure. Specifically, a description of a technology in the "Background" is not to be construed as an admission that technology is prior art to any embodiments in this disclosure. Furthermore, any reference in this disclosure to "invention" in the singular should not be used to argue that there is only a single point of novelty in this disclosure. Multiple inventions may be set forth according to the limitations of the claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method of managing distributed ledger data, the method comprising:
    establishing a communication channel between a processor and a computing device of a provider;
    receiving, at the processor, a communication request sent by the computing device of the provider along the communication channel, the communication request being a request to process a recording of a transfer of digital tokens from the provider to a plurality of registered users;
    performing, by the processor, a first selection process, the first selection process including:
        extracting, from the communication request, one or more user criterion, the extracted one or more user criterion being one or more desired user attributes in encrypted form;
        transforming the one or more user criterion into the one or more desired user attributes;
        searching a database, the database including information for a plurality of unregistered users and a plurality of the registered users, the searching including identifying a plurality of the registered users having a plurality of stored attributes stored in the database; and
        selecting a plurality of candidate users from among the plurality of registered users identified in the searching of the database, wherein each candidate user is selected when one or more of the stored attributes of the candidate user matches the one or more desired user attributes;
    performing, by the processor, a second selection process, the second selection process including:
        extracting, from the communication request, one or more location criterion, the extracted one or more location criterion being one or more desired user locations in encrypted form;
        transforming the one or more location criterion into the one or more desired user locations;
        communicating, between the processor and a computing device of each candidate user selected from the first selection process, the communicating including obtaining, by the processor, a current geolocation of the computing device of each candidate user selected from the first selection process;
        obtaining, by the processor from a location database, one or more historic geolocations of the computing device of each candidate user selected from the first selection process; and
        selecting, from among the plurality of candidate users selected from the first selection process, one or more selected users, wherein the one or more selected users are selected when:
            the current geolocation of the computing device of each selected user is within a threshold distance from a first desired user location, the first desired user location being one of the desired user locations; and
            the one or more historic geolocations of the computing device of each selected user is within the threshold distance from the first desired user location; and
    responsive to a selecting, by the processor, of the one or more selected users based on the second selection process:
        sending, from the processor to a computing device of a first selected user, an interactive option to accept a transfer of a first quantity of digital tokens from the provider to the first selected user, the first selected user being one of the selected users selected from the second selection process;
        processing, by the processor, a transfer record for the transfer of the first quantity of digital tokens from the provider to the first selected user when the first selected user interacts with the interactive option in a manner that represents an acceptance of the transfer of the first quantity of digital tokens from the provider; and
        recording, by the processor in a first distributed ledger, the transfer record.

2. The method of claim 1, further comprising:
    extracting, from the communication request, a total quantity of digital tokens to transfer from the provider to the one or more registered users; and
    determining, based on the total quantity of digital tokens and a quantity of the selected users, the first quantity of digital tokens.

3. The method of claim 1, further comprising obtaining, by the processor, one or more historic geolocations of the computing device of each candidate user;
    wherein the one or more of the historic geolocations of the computing device of that candidate user is within at least a threshold distance from at least one of the desired user locations.

4. The method of claim 1, further comprising-obtaining, by the processor from the first distributed ledger, contextual information for each of the plurality of candidate user.

5. The method of claim 4, wherein the selecting of the plurality of candidate users is further based on the obtained contextual information.

6. The method of claim 1, wherein the communicating, between the processor and the computing device of each candidate user, includes obtaining, by the processor, contextual information, the contextual information including one or more historic interactions between the candidate user and the computing device of the candidate user.

7. The method of claim 6, wherein the selecting of the plurality of candidate users is further based on the obtained contextual information.

8. The method of claim 1, wherein the database is a distributed ledger.

* * * * *